United States Patent
Ode

(10) Patent No.: US 9,673,873 B2
(45) Date of Patent: Jun. 6, 2017

(54) MOBILE COMMUNICATIONS SYSTEM, BASE STATION, MOBILE STATION, AND WIRELESS COMMUNICATION METHOD

(75) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/567,579

(22) Filed: Aug. 6, 2012

(65) Prior Publication Data

US 2012/0300732 A1    Nov. 29, 2012

Related U.S. Application Data

(63) Continuation of application No. PCT/JP2010/052013, filed on Feb. 12, 2010.

(51) Int. Cl.
| | |
|---|---|
| *H04B 7/02* | (2017.01) |
| *H04B 7/022* | (2017.01) |
| *H04W 72/00* | (2009.01) |
| *H04L 5/00* | (2006.01) |

(52) U.S. Cl.
CPC .......... *H04B 7/022* (2013.01); *H04W 72/005* (2013.01); *H04L 5/001* (2013.01)

(58) Field of Classification Search
USPC ..... 370/328–329; 455/63.1, 450, 452.1, 502, 455/509, 522–524
See application file for complete search history.

(56) References Cited

U.S. PATENT DOCUMENTS

| | | | |
|---|---|---|---|
| 2007/0249380 A1* | 10/2007 | Stewart | H04B 7/022 455/502 |
| 2008/0026691 A1 | 1/2008 | Gao | |
| 2008/0026715 A1 | 1/2008 | Gao | |
| 2009/0232062 A1* | 9/2009 | Higuchi et al. | 370/329 |

(Continued)

FOREIGN PATENT DOCUMENTS

| | | |
|---|---|---|
| EP | 2234420 | 9/2010 |
| JP | 05-259969 | 10/1993 |

(Continued)

OTHER PUBLICATIONS

Panasonic, "System information acquisition at the start of carrier aggregation", Aug. 24-28, 2009, Agenda Item: 7.3, R2-094186, 3GPP TSG RAN WG2#67, Shenzhen, China.

(Continued)

*Primary Examiner* — Andrew Lai
*Assistant Examiner* — Chuong M Nguyen
(74) *Attorney, Agent, or Firm* — Myers Wolin, LLC

(57) ABSTRACT

In a mobile communications system, a base station includes a generation unit and a transmission unit. The generation unit generates broadcast information indicating, among a plurality of available frequency bands for wireless communication, a frequency band to be used to transmit same data at a same timing with another base station. The transmission unit broadcasts the broadcast information. A mobile station includes a reception unit and a control unit. The reception unit receives the broadcast information broadcast by the base station. The control unit controls, based on the broadcast information, reception of same data transmitted at the same timing from the base station and the other base station.

9 Claims, 27 Drawing Sheets

(56) References Cited

U.S. PATENT DOCUMENTS

| | | | | |
|---|---|---|---|---|
| 2010/0002617 | A1* | 1/2010 | Seyama | H04B 1/7083 370/312 |
| 2010/0067464 | A1* | 3/2010 | Higuchi | H04L 5/0007 370/329 |
| 2010/0075689 | A1* | 3/2010 | Uemura | H04W 52/0206 455/452.1 |
| 2010/0113041 | A1* | 5/2010 | Bienas | H04W 48/10 455/450 |
| 2010/0172272 | A1* | 7/2010 | Tenny | H04W 24/00 370/280 |
| 2010/0177697 | A1* | 7/2010 | Tanno et al. | 370/328 |
| 2010/0272004 | A1* | 10/2010 | Maeda | H04L 5/0007 370/312 |
| 2011/0116465 | A1* | 5/2011 | Miki | H04W 72/1215 370/329 |
| 2011/0134871 | A1* | 6/2011 | Nogami | H04L 5/0044 370/329 |

FOREIGN PATENT DOCUMENTS

| | | |
|---|---|---|
| JP | 2008-278339 | 11/2008 |
| JP | 2009-182575 | 8/2009 |
| JP | 2009-182944 | 8/2009 |
| JP | 2009-188612 | 8/2009 |
| JP | 2009-253614 | 10/2009 |
| JP | 2009-545269 | 12/2009 |
| WO | 2008/016556 | 2/2008 |
| WO | 2009/078152 | 6/2009 |

OTHER PUBLICATIONS

Panasonic, "System information acquisition at the start of carrier aggregation", Oct. 12-16, 2009, Agenda Item: 7.3.1, R2-095603, 3GPP TSG RAN WG2#67bis, Miyazaki, Japan.

Panasonic, "System information acquisition at the start of carrier aggregation", Nov. 9-13, 2009, Agenda Item: 7.3.4, R2-096489, 3GPP TSG RAN WG2#68, Jeju, Korea.

LG Electronics Inc., "Discussion on Service Continuity", May 4-8, 2009, Agenda Item: 6.3.1, R2-093018, 3GPP TSG-RAN WG2 #66, San Francisco, California (US).

Nokia et al., "On MBMS service continuity", Nov. 5-9, 2007, Agenda Item: 4.6.5, R2-074853, 3GPP TSG-RAN WG2 Meeting #60, Jeju, Korea.

Panasonic, "System Information Modification Indication in Carrier Aggregation", Aug. 24-28, 2009, Agenda Item: 7.3, R2-094187, 3GPP TSG RAN WG2 #67, Shenzhen, China.

Ericsson, "Physical-layer-related parameters to be configured by RRC", Jun. 25-29, 2007, Agenda Item: 4, R1-073221, TSG-RAN WG1 #49bis, Orlando, Florida (US).

Vodafone Group, "Report of email discussion on MBMS definitions (Point 3)", May 7-11, 2007, Agenda Item: 4.2, R2-072148, 3GPP TSG RAN WG2#58, Kobe, Japan.

Office Action issued for corresponding Japanese Patent Application No. 2011-553685, dated Apr. 23, 2013 with partial English translation.

International Search Report issued for corresponding International Patent Application No. PCT/JP2010/052013, mailing date of Apr. 27, 2010.

3GPP TS 36.331 V9.0.0; 3rd Generation Partnership Project; Technical Specification Group Radio Access Network; Evolved Universal Terrestrial Radio Access (E-UTRA) Radio Resource Control (RRC); Protocol specification (Release 9); Sep. 2009.

3GPP TR 36.912 V9.0.0; 3rd Generation Partnership Project; Technical Specification Group Radio Access Network; Feasibility study for Further Advancements for E-UTRA (LTE-Advanced) (Release 9); Sep. 2009.

3GPP TS 36.300 V9.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); Sep. 2009.

* cited by examiner

MOBILE COMMUNICATIONS SYSTEM, BASE STATION, MOBILE STATION, AND WIRELESS COMMUNICATION METHOD

CROSS-REFERENCE TO RELATED APPLICATION

This application is a continuation application of International Application PCT/JP2010/052013 filed on Feb. 12, 2010 and designated the U.S., the entire contents of which are incorporated herein by reference.

FIELD

The embodiments discussed herein are related to a mobile communications system, a base station, a mobile station, and a wireless communication method.

BACKGROUND

Currently, mobile communications systems such as mobile phone systems and wireless MANs (Metropolitan Area Networks) have come into common use. In addition, active discussions on next generation mobile communications technology have been continued in order to further increase the transmission speed and capacity of wireless communication. For example, the 3GPP (3rd Generation Partnership Project), which is a standards body, has proposed a communication standard called LTE (Long Term Evolution) which allows communication using a frequency bandwidth up to 20 MHz (see, for example, 3GPP (3rd Generation Partnership Project), "Evolved Universal Terrestrial Radio Access (E-UTRA) and Evolved Universal Terrestrial Radio Access Network (E-UTRAN); Overall description", 3GPP TS 36.300 V9.1.0, 2009-09., and 3GPP (3rd Generation Partnership Project), "Evolved Universal Terrestrial Radio Access (E-UTRA) Radio Resource Control (RRC); Protocol specification", 3GPP TS 36.331 V9.0.0, 2009-09.). Further, a communication standard called LTE-A (LTE-Advanced) which allows communication using up to five 20-MHz bandwidth carriers (that is, frequency bandwidth up to 100 MHz) has been proposed as a next generation communication standard after the LTE standard (see, for example, 3GPP (3rd Generation Partnership Project), "Feasibility study for Further Advancements for E-UTRA (LTE-Advanced)", 3GPP TR 36.912 V9.0.0, 2009-09.).

In addition, for some of such communication standards, adoption of a data transmission scheme called MBSFN (Multimedia Broadcast multicast service Single Frequency Network) has been discussed (see, for example, 3GPP (3rd Generation Partnership Project), "Feasibility study for Further Advancements for E-UTRA (LTE-Advanced)", 3GPP TR 36.912 V9.0.0, 2009-09.). In MBSFN operation, a plurality of base stations transmit same data at the same timing using the same frequency and the same modulation scheme. Data transmitted using MBSFN is sometimes called the "MBMS (Multimedia Broadcast Multicast Service) data". A mobile station combines signals received from a plurality of base stations, which results in an improvement in reception quality. Note that a method related to MBMS data transmission has been proposed in which user equipment (mobile station) transmits, to a base station apparatus, feedback information reporting that MBMS data fails to meet predetermined quality, and the base station apparatus determines, based on the feedback information, whether to perform adaptive modulation or not (see, for example, Japanese Laid-open Patent Publication No. 2008-278339).

In addition, a technique has been proposed in which a base station transmits an MBSFN reference signal related to MBSFN to a mobile station and differentiates subframes used for MBSFN transmission (MBSFN subframes) from non-MBSFN subframes (see, for example, paragraphs [0095] and [0096] of Japanese Laid-open Patent Publication No. 2009-253614).

It is considered to enable, in a mobile communications system capable of using a plurality of frequency bands, like an LTE-A system, a plurality of base stations to transmit same data at the same timing to a mobile station. However, for such a mobile communications system, the problem of how to efficiently use wireless resources of the frequency bands becomes an issue. For example, since having a different structure from a non-MBSFN subframe, an MBSFN subframe may not hold MBMS data together with different types of user data (i.e., non-MBMS data). In addition, MBSFN transmission may be started by a mobile station transmitting a request to a base station. If the mobile station makes a request for MBSFN transmission using an arbitrary frequency band and the base station then starts the MBSFN transmission using the arbitrary frequency bandwidth corresponding to the request from the mobile station, MBSFN subframes incapable of holding other types of user data appear distributedly. This may cause a reduction in the efficiency in wireless resource use.

SUMMARY

According to one aspect, there is provided a mobile communications system where a plurality of frequency bands are used at a time. The mobile communications system includes: a base station which includes a generation unit configured to generate information indicating, among a plurality of available frequency bands for wireless communication, a frequency band to be used to transmit same data at a same timing with another base station, and a transmission unit configured to transmit the information; and a mobile station which includes a reception unit configured to receive the information from the base station, and a control unit configured to control, based on the information, reception of the same data transmitted at the same timing from the base station and said another base station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
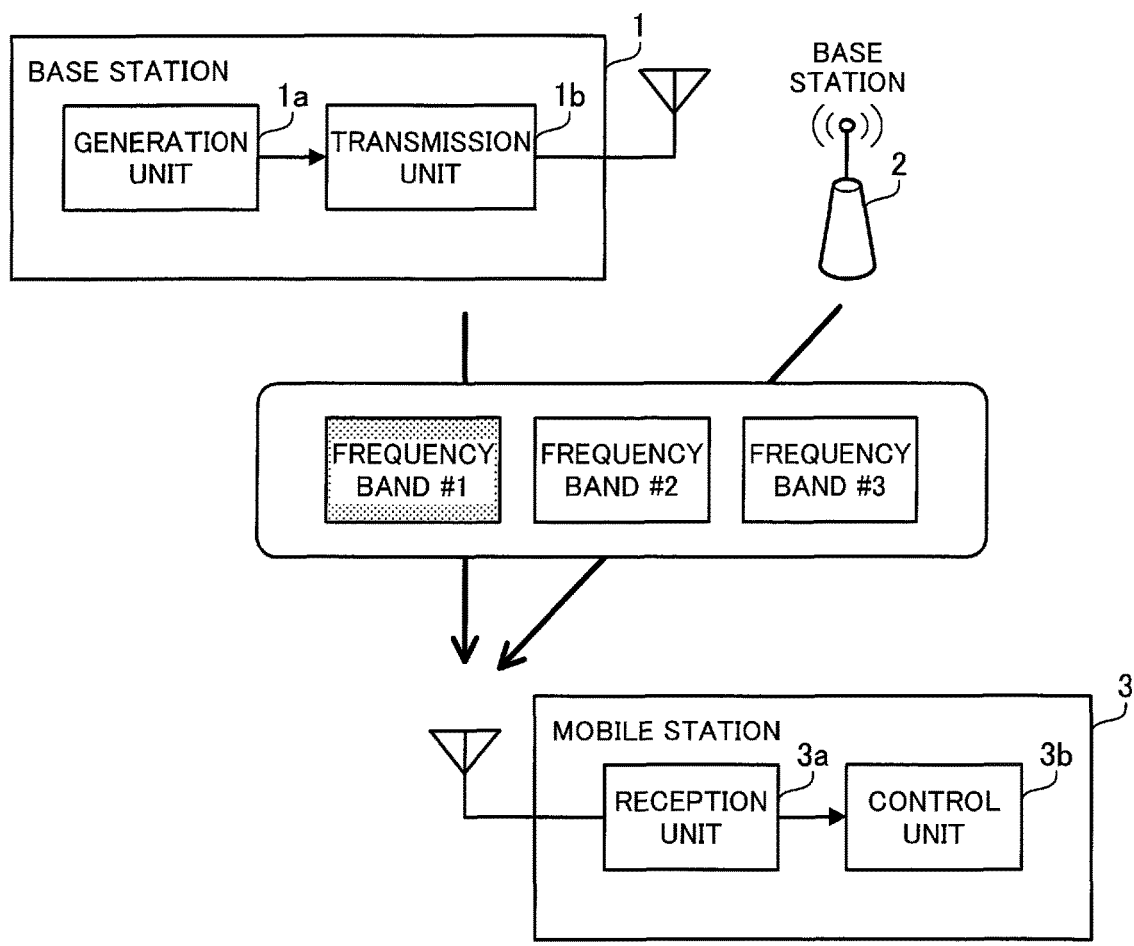
FIG. 1 illustrates a mobile communications system according to a first embodiment.

Several embodiments will be described below with reference to the accompanying drawings, wherein like reference numerals refer to like elements throughout.

(a) First Embodiment

FIG. 1 illustrates a mobile communications system according to a first embodiment. The mobile communications system according to the first embodiment includes base stations 1 and 2 and a mobile station 3. The base stations 1 and 2 are wireless communication apparatuses capable of individually performing wireless communication with the mobile station 3. The base stations 1 and 2 are, directly or via a higher-level network, connected to each other. The base station 1 uses a plurality of frequency bands for wireless communication. The base station 2 may use a plurality of frequency bands in a similar fashion. The mobile station 3 is a wireless communication apparatus for performing wireless communication by setting up a connection to the base stations 1 and 2, and is a terminal such as a mobile telephone and a mobile information terminal, for example. The mobile station 3 performs wireless communication using one or more frequency bands selected from the above-mentioned frequency bands.

The base station 1 includes a generation unit 1a and a transmission unit 1b. The generation unit 1a generates broadcast information indicating, among the frequency bands, a frequency band to be used to transmit same data at the same timing with other base stations (for example, the base station 2). The frequency band may be set to be shared by the base stations 1 and 2. In addition, the same modulation scheme to be applied to the data transmission may be set for both the base stations 1 and 2. The transmission unit 1b wirelessly transmits (broadcasts) the broadcast information generated by the generation unit 1a. As with the base station 1, the base station 2 may broadcast broadcast information indicating a frequency band to be used.

The mobile station 3 includes a reception unit 3a and a control unit 3b. The reception unit 3a receives the broadcast information transmitted by the base station 1. Based on the received broadcast information, the control unit 3b controls a process of receiving same data transmitted at the same timing from the base station 1 and other base stations (for example, the base station 2). The mobile station 3 improves reception quality, for example, by combining signals transmitted from the base stations 1 and 2 and demodulating and decoding the combined signal. The mobile station 3 may combine signals from three or more base stations.

Here, the base station 1 may transmit the broadcast information generated by the generation unit 1a with a broadcast channel. The broadcast channel may be the same channel as a broadcast channel with which information to be used by the mobile station 3 to set up a connection to the base station 1 is transmitted, or may be a different channel. In the latter case, the channel with which the information used to set up a connection to the base station 1 is transmitted (a first broadcast channel) may be set as a channel commonly used by both first-type and second-type mobile stations, and the channel with which the broadcast information generated by the generation unit 1a is transmitted (a second broadcast channel) may be set as a channel to which the second-type mobile station uses but the first-type mobile station does not use. In addition, the base station 1 may transmit (broadcast) the broadcast information generated by the generation unit 1a with a control channel. In addition, the base station 1 may employ the lowest frequency band among the frequency bands as a frequency band to be used by a plurality of base stations to transmit same data at the same timing. In addition, the base station 1 may append identification information to each of the frequency bands. The identification information may be employed, in the broadcast information, to represent the frequency band to be used. As the identification information, cell IDs (identifiers) or unique numbers in a single cell, for example, may be used. In the case where cell IDs are used as the identification information, a plurality of cell IDs are assigned to one cell.

In addition, in the case where the frequency band indicated by the received broadcast information is different from the frequency band used by the mobile station 3 to connect to the base station 1, the mobile station 3 may change the currently used frequency band. In that case, after making the frequency band change, the mobile station 3 may request, using wireless resources corresponding to the post-change frequency band, the base station 1 to perform a process of transmitting same data at the same timing. Alternatively, prior to making the frequency band change, the mobile station 3 may make the request to the base station 1, using wireless resources corresponding to the pre-change frequency band. Note that not only a change of a connection-destination base station but also a change of a frequency band is sometimes referred to as the "handover".

The mobile communications system may be implemented, for example, as an LTE-A system. In that case, each of the frequency bands is sometimes referred to as the "component carrier (CC)" or "carrier component (CC)". In addition, the above-mentioned first-type mobile station may be implemented as a mobile station complying with LTE and the second-type mobile station may be implemented as a mobile station complying with LTE-A. In addition, the first broadcast channel may be implemented as a broadcast channel commonly defined in both LTE and LTE-A and the second broadcast channel may be implemented as an extended broadcast channel which is not defined in LTE.

According to such a mobile communications system of the first embodiment, the base station 1 generates broadcast information indicating, among available frequency bands for wireless communication, a frequency band to be used to transmit same data at the same timing with the base station 2. The generated broadcast information is broadcast wirelessly. Subsequently, the mobile station 3 receives the broadcast information transmitted from the base station 1. Based on the received broadcast information, the mobile station 3 receives same data transmitted at the same timing from the base stations 1 and 2. That is, the mobile station 3 is caused to utilize a particular frequency band so that wireless resources used by a plurality of base stations to transmit same data at the same timing do not spread over the entire frequency bands. This improves the efficiency in wireless resource use in the case where a plurality of base stations transmit same data at the same timing. In particular, since the information indicating the frequency band to be used has been broadcast, the mobile station 3 is able to select an appropriate frequency band before the start of the reception process. In addition, the propagation range of radio waves increases in the case of using a lower frequency band among the frequency bands, which therefore enables the mobile station 3 to receive and combine signals transmitted from base stations further away. As a result, it is possible to further improve reception quality of the mobile station 3.

Second to fourth embodiments described below are directed to cases in which the wireless communication method according to the first embodiment is applied to an LTE-A system. Note however that it is clear that the above-described wireless communication method is also applicable to other types of mobile communications systems.

(b) Second Embodiment

Figure 2:
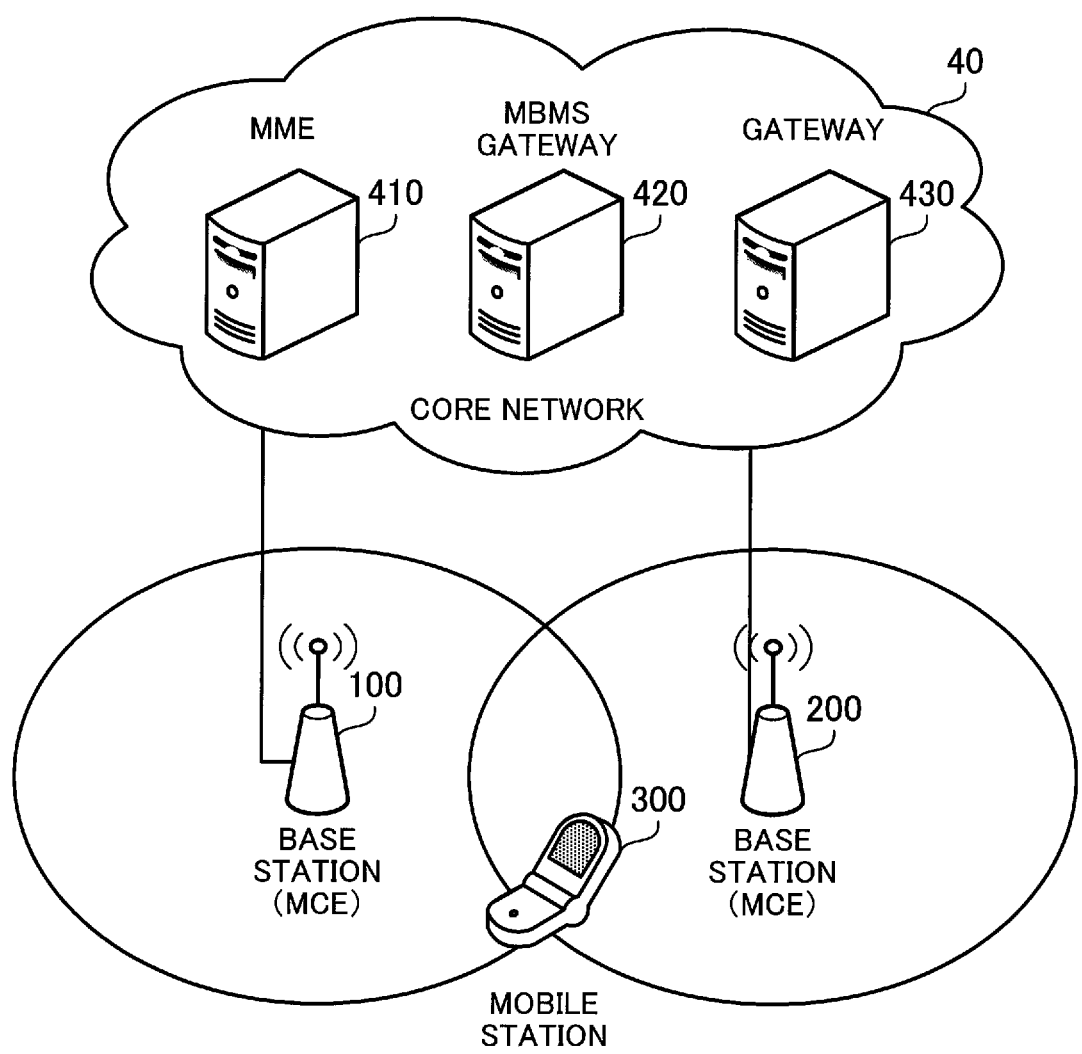
FIG. 2 illustrates a mobile communications system according to a second embodiment.

FIG. 2 illustrates a mobile communications system according to the second embodiment. The mobile communications system of the second embodiment includes base stations 100, 200, a mobile station 300, and a core network 40. In the core network 40, a MME (Mobility Management Entity) 410, an MBMS gateway 420, and a gateway 430 are provided. The mobile communications system complies with the LTE-A communication standard. The base stations 100 and 200 are wireless communication apparatuses capable of individually performing wireless communication with the mobile station 300. The base station 100 is connected to the core network 40 which is a wired network, and transfers data between the mobile station 300 and the core network 40. The base stations 100 and 200 use five component carriers (hereinafter referred to as the "CCs") in the wireless communication. In addition, the base stations 100 and 200 are capable of MBSFN transmission, that is, transmitting same MBMS data at the same timing using the same frequency. In addition, the base stations 100 and 200 operate as MCEs (multi-cell/multicast coordination entities) for controlling MBSFN transmission. That is, between the base stations 100 and 200, a base station to which the mobile station 300 is connected determines a plurality of base stations for performing the MBSFN transmission and also performs scheduling of wireless resources to be used for the MBSFN transmission. The following description is directed to a case in which the base station 100 initiatively controls the MBSFN transmission to the mobile station 300.

The mobile station 300 is a wireless terminal for performing wireless communication with the base stations 100 and 200, and is a mobile telephone or a mobile information terminal, for example. The mobile station 300 is capable of receiving data simultaneously using up to five CCs in a downlink (a wireless link from the base stations 100 and 200 to the mobile station 300) and transmitting data simultaneously using up to two CCs in an uplink (a wireless link from the mobile station 300 to the base stations 100 and 200). The number of available CCs for the mobile station 300 is controlled by the base stations 100 and 200. In addition, the mobile station 300 receives MBMS data MBSFN-transmitted by the base stations 100 and 200. That is, the mobile station 300 makes an MBSFN request (MBSFN transmission request) to a base station with which a connection has been established. Subsequently, the mobile station 300 receives, from the base stations 100 and 200, signals including same MBMS data transmitted at the same timing using the same frequency, then combines the received signals and demodulates and decodes the combined signal. Note that the MBSFN transmission may be performed with only one CC, or may be performed with CCs at the same time. The following description is directed to a case in which the MBSFN transmission is performed using only one CC.

The MME 410 is an apparatus for performing mobility management of the mobile station 300. The MME 410 communicates with the base stations 100 and 200 and manages a serving cell of the mobile station 300. The MBMS gateway 420 is an apparatus for processing MBMS data to be received by the mobile station 300. The MBMS gateway 420 transfers, to the base stations 100 and 200, MBMS data destined for the mobile station 300. The gateway 430 is an apparatus for processing user data (except for the MBMS data) transmitted and received by the mobile station 300. The gateway 430 transfers, to the base station 100 or 200, user data destined for the mobile station 300.

Note that, in the second embodiment, a mobile station which does not use a plurality of CCs in aggregation is referred to as an LTE mobile station, and a mobile station capable of using a plurality of CCs in aggregation is referred to as an LTE-A mobile station. The mobile station 300 is an LTE-A mobile station. Both LTE-A mobile stations and LTE mobile stations are allowed to set up a connection to the base stations 100 and 200. In the 3GPP, the LTE communication standard is defined in the 3GGP Release 9 specifications and the LTE-A communication standard is defined in the 3GGP Release 10 specifications.

Figure 3:
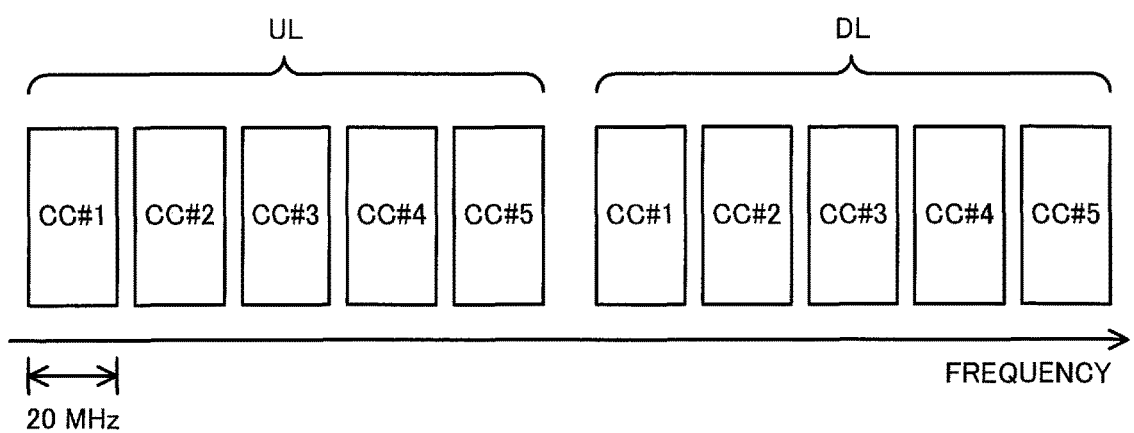
FIG. 3 illustrates a configuration example of component carriers.

FIG. 3 illustrates a configuration example of component carriers. The base stations 100 and 200 use five CCs, as illustrated in FIG. 3. In the case of using Frequency Division Duplex (FDD) for bidirectional communication, frequency bands of CCs #1 to #5 are provided individually for the downlink (DL) and the uplink (UL). In the following description, the pairs of the DL frequency bands and the UL frequency bands are sometimes referred to simply as CCs #1 to #5. For both the DL and UL, each CC has a bandwidth of 20 MHz, and the total bandwidth is 100 MHz. The base stations 100 and 200 perform wireless resource allocation (scheduling) for each of CCs #1 to #5. Note that, according to the example of FIG. 3, bidirectional communication is achieved using FDD, however, it may be achieved using Time Division Duplex (TDD). In that case, five CCs are provided on the frequency axis with no separation between the DL and UL. In addition, all the CCs have a bandwidth of 20 MHz according to the example of FIG. 3, however, they may have a different bandwidth (for example, 5 MHz, 10 MHz, or 15 MHz). Further, it is not necessary that all the CCs have the same bandwidth. In addition, according to the example of FIG. 3, the UL wireless resources are provided on the lower frequency side and the DL wireless resources are provided on the higher frequency side. By providing the UL wireless resources on the lower frequency side, it is possible to keep the transmission power of the mobile station 300 low since a signal of a lower frequency has a smaller propagation loss. Note however that the locations of the UL wireless resources and the DL wireless resources on the frequency axis may be switched. Thus, by aggregating CCs among CCs #1 to #5, the mobile station 300 is capable of performing data transmission and reception using a wider bandwidth (for example, 40 MHz, 60 MHz, 80 MHz, or 100 MHz) than the bandwidth of one CC (for example, 20 MHz). Note here that all CCs #1 to #5 may be provided in a single frequency band, such as an 800 MHz band, a 2.5 GHz band, or a 3.5 GHz band, or may be provided separately in different frequency bands. Aggregating continuous or discontinuous CCs belonging to the same frequency band is sometimes referred to as the "carrier aggregation". On the other hand, aggregating CCs belonging to different frequency bands is sometimes referred to as the "spectrum aggregation".

Figure 4:
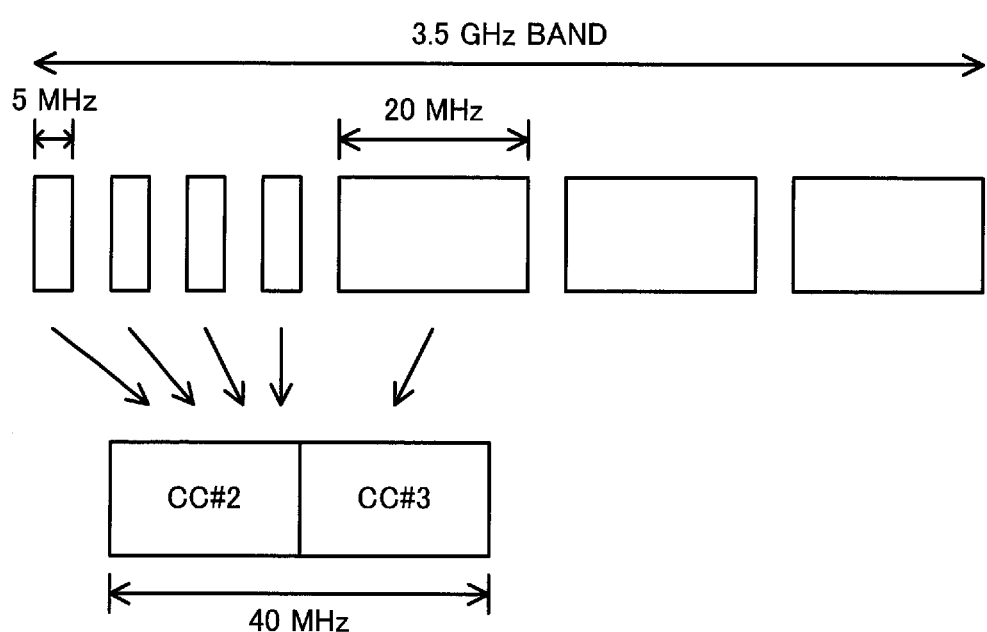
FIG. 4 illustrates a first example of carrier aggregation.

FIG. 4 illustrates a first example of carrier aggregation. According to the example of FIG. 4, four discontinuous bands each having a bandwidth of 5 MHz and three discontinuous bands each having a bandwidth of 20 MHz are provided in the 3.5 GHz band as available bands for wireless communication. Then, the four 5 MHz bands are aggregated to thereby form CC #2 with a bandwidth of 20 MHz. In addition, one band with a bandwidth of 20 MHz is defined as CC #3. The mobile station 300 is able to, for example, use CC #2 and CC #3 as a frequency band of 40 MHz (logically a single frequency band) by carrier aggregation. In this case, in reality, the mobile station 300 uses the four 5 MHz-bandwidth bands and one 20 MHz-bandwidth band belonging to the 3.5 GHz band. Although FIG. 4 illustrates an example of frequency bands belonging to the 3.5 GHz band, it is possible to aggregate and use bands each having a frequency bandwidth equal to or smaller than 20 MHz also in a different frequency band, such as the 800 MHz band.

Figure 5:
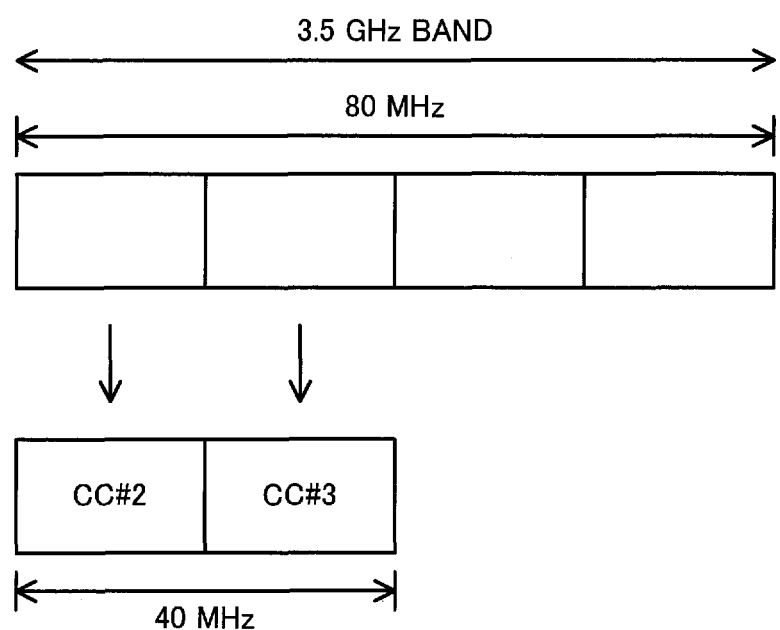
FIG. 5 illustrates a second example of the carrier aggregation.

FIG. 5 illustrates a second example of the carrier aggregation. According to the example of FIG. 5, a continuous 80 MHz-bandwidth band is provided in the 3.5 GHz band as an available band for wireless communication. Then, the 80 MHz-bandwidth band is divided into four, which are individually defined as CC #2 to CC #5 each having a bandwidth of 20 MHz. The mobile station 300 is able to, for example, use CC #2 and CC #3 as a frequency band of 40 MHz (logically a single frequency band) by carrier aggregation. In this case, in reality, the mobile station 300 uses a part of the continuous 80 MHz-bandwidth band belonging to the 3.5 GHz band.

Figure 6:
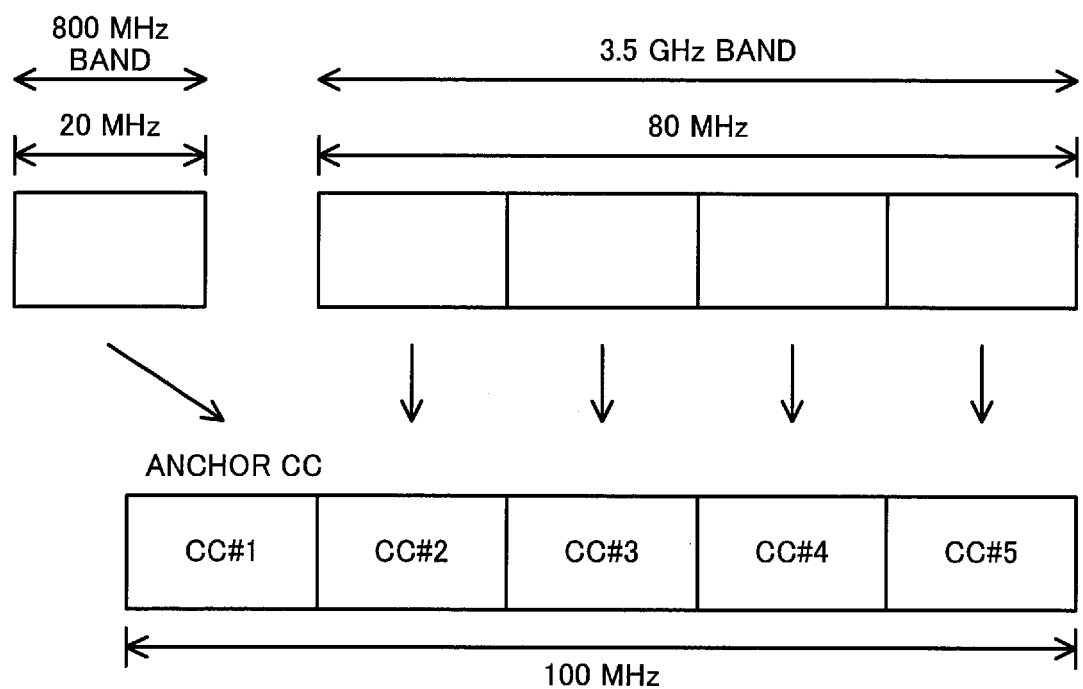
FIG. 6 illustrates an example of spectrum aggregation.

FIG. 6 illustrates an example of spectrum aggregation. According to the example of FIG. 6, a continuous 20 MHz-bandwidth band is provided in the 800 MHz band as an available band for wireless communication. In addition, a continuous 80 MHz-bandwidth band is provided in the 3.5 GHz band as an available band for wireless communication. Then, besides the 20 MHz-bandwidth band in the 800 MHz band is defined as CC #1, the 80 MHz-bandwidth band in the 3.5 GHz band is divided into four, which are individually defined as CC #2 to CC #5 each having a bandwidth of 20 MHz. The mobile station 300 is able to, for example, use CCs #1 to #5 as a frequency band of 100 MHz (logically a single frequency band) by spectrum aggregation. In this case, in reality, the mobile station 300 uses the 20 MHz-bandwidth band belonging to the 800 MHz band and the continuous 80 MHz-bandwidth band belonging to the 3.5 GHz band. Note that, as in the case of FIG. 4, CC #1 may be formed by aggregating a plurality of bands which belong to the 800 MHz band and each of which has a frequency bandwidth equal to or smaller than 20 MHz. The 800 MHz band has a long radio wave propagation range than that of the 3.5 GHz band, and therefore enables more stable wireless communication. Accordingly, CC #1 belonging to the 800 MHz band may be preferentially used for data transmission and reception between a base station and a mobile station far apart from each other and transmission and reception of important data. In that case, CC #1 may be referred to as the "anchor CC".

Figure 7:
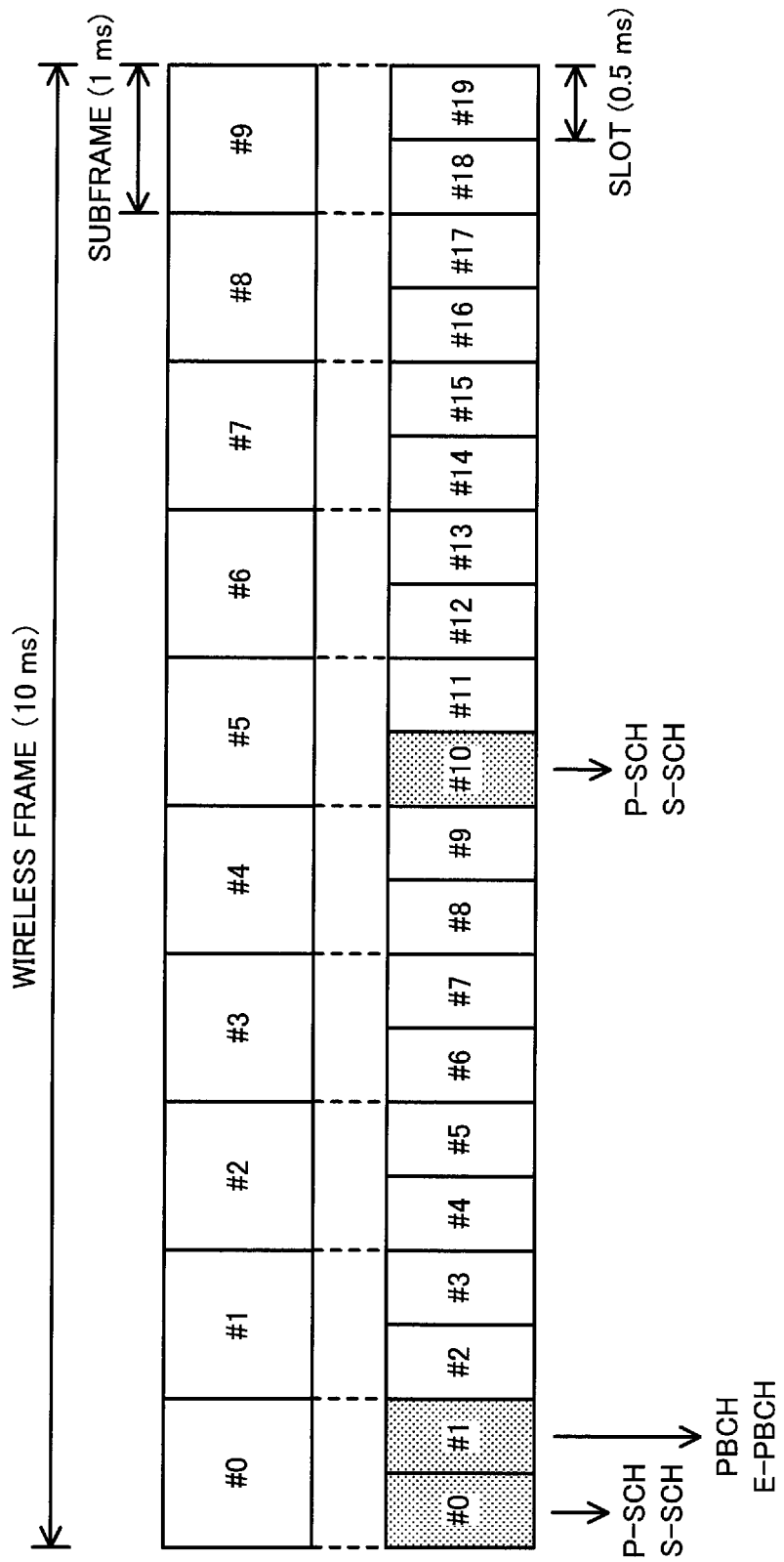
FIG. 7 illustrates a structural example of a radio frame.

FIG. 7 illustrates a structural example of a radio frame. In each of CCs #1 to #5, the radio frame as illustrated in FIG. 7 is transmitted and received between the base stations 100 and 200 and the mobile station 300. Note however that the structure of FIG. 7 is merely an example, and the structure of a radio frame is not limited to this example. According to the example, a radio frame having a cycle of 10 ms includes 10 subframes (Subframes #0 to #9) each having a width of 1 ms. Each subframe includes two slots each having a width of 0.5 ms. That is, the 10 ms-cycle radio frame includes 20 slots (Slots #0 to #19). In a DL radio frame, a Primary Synchronization CHannel (P-SCH) and a Secondary Synchronization CHannel (S-SCH) for transmitting synchronization signals are assigned to Slots #0 and #10. In addition, a Physical Broadcast CHannel (PBCH) and an Extended Physical Broadcast CHannel (E-PBCH) for transmitting (broadcasting) broadcast information are assigned to Slot #1. Wireless resources in the radio frame are managed by being subdivided in the time and frequency directions. OFDMA (Orthogonal Frequency Division Multiple Access) is used for DL frames, and SC-FDMA (Single-Carrier Frequency Division Multiple Access) is used for UL frames. The time and frequency wireless resources are assigned to each channel. Each slot includes 7 or 6 symbols in the time direction. In a symbol, a signal called "CP (Cyclic Prefix)" is inserted. There are two types of CPs, a normal CP and an extended CP having a different length from each other. 7 symbols are included in one slot in the case of using a normal CP, and 6 symbols are included in one slot in the case of using an extended CP. In the frequency direction, a CC includes a plurality of subcarriers.

Figure 8:
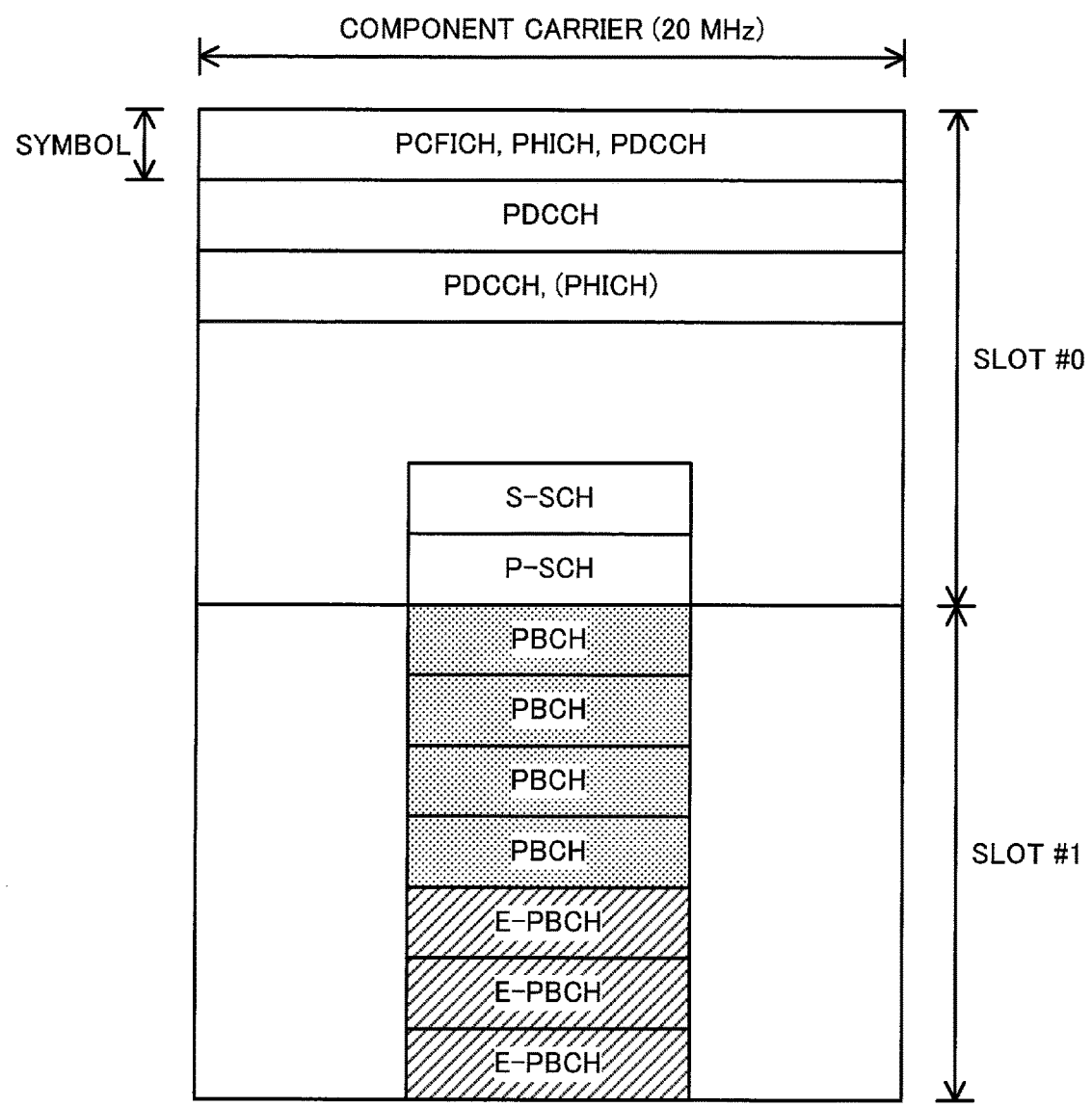
FIG. 8 illustrates a first example of assigning an extended physical broadcast channel.

FIG. 8 illustrates a first example of assigning an extended physical broadcast channel. In FIG. 8, the vertical direction represents a time axis and the horizontal direction represents a frequency axis. In addition, the example of FIG. 8 is a case of using normal CPs, that is, a case where 7 symbols are included in one slot. In a DL frame, a PCFICH (Physical Control Format Indicator CHannel) and a PHICH (Physical Hybrid automatic repeat request Indicator CHannel) are assigned to the first symbol of Slot #0. The PCIFH is a channel for making a notification of the number of symbols to which a Physical Downlink Control CHannel (PDCCH) is assigned. The PHICH is a channel for returning an ACK (ACKnowledgement) response or a NACK (Negative ACKnowledgement) response with regard to data reception.

The PHICH may be assigned to the third symbol. In addition, the above-described PDCCH is assigned to the first symbol of Slot #0. The PDCCH is a channel for transmitting L1/L2 (Layer 1/Layer 2) control information. The PDCCH may also be assigned to the second and third symbols. The number of symbols for the PDCCH is variable between 1 and 3. Further, in Slot #0, the above-described S-SCH is assigned to the sixth symbol, and the above-described P-SCH is assigned to the seventh symbol. The P-SCH is a channel in which one of a predetermined number (for example, 3) of primary synchronization signal sequences is transmitted. The S-SCH is a channel in which one of a predetermined number (for example, 168) of secondary synchronization signal sequences is transmitted. Combinations of the P-SCH sequences and the S-SCH sequences (for example, 3×168=504 combinations) correspond to cell IDs. In addition, in Slot #1, the above-described PBCH is assigned to the first to fourth symbols, and the above-described E-PBCH is assigned to the fifth to seventh symbols. In the wireless resource region, the E-PBCH is adjacent to the PBCH in the time direction. The PBCH is a broadcast channel commonly defined in LTE and LTE-A. The E-PBCH is a broadcast channel added in LTE-A. That is, the mobile station 300, which is an LTE-A mobile station, is capable of detecting both the PBCH and the E-PBCH. On the other hand, an LTE mobile station is able to detect the PBCH but not the E-PBCH.

Broadcast information transmitted through the PBCH includes information to be used by the mobile station 300 to set up a connection to a CC in which the PBCH is provided. For example, the broadcast information of the PBCH includes information indicating a frequency bandwidth (for example, 5 MHz, 10 MHz, 15 MHz, or 20 MHz). This is because frequency bandwidths are variable in LTE and LTE-A. Broadcast information transmitted by the E-PBCH (extended broadcast information) may include information related to a plurality of CCs having been configured. For example, in order to achieve efficient scheduling, the base stations 100 and 200 may limit CCs used for the MBSFN transmission. In that case, information indicating, among CCs #1 to #5, available CCs for the MBSFN transmission may be transmitted by being included in the extended broadcast information. With this, the mobile station 300 is able to recognize the available CCs before making an MBSFN request to the base station 100. Note that, in the extended broadcast information, the available CCs for the MBSFN transmission may be indicated by IDs assigned in advance to CCs #1 to #5. The S-SCH, P-SCH, PBCH and E-PBCH may be assigned only to partial frequencies (subcarrier), as illustrated in FIG. 8, rather than being assigned to the entire frequencies (subcarrier) of one CC. For example, these channels are assigned to frequencies near the center of the CC. The channel assignment is made to frequencies near the center of the CC, not to frequencies near the boundary of the CC, in order to facilitate channel detection performed by the mobile station 300. Subcarrier frequencies assigned to the E-PBCH may be the same as, or different from, those assigned to the PBCH. In addition, in a DL frame, a Reference Signal (RS) which is a known pilot signal is transmitted using a part of resources different from the wireless resources used for the above-described channels. Using the RS, the mobile station 300 is able to measure the reception quality.

Figure 9:
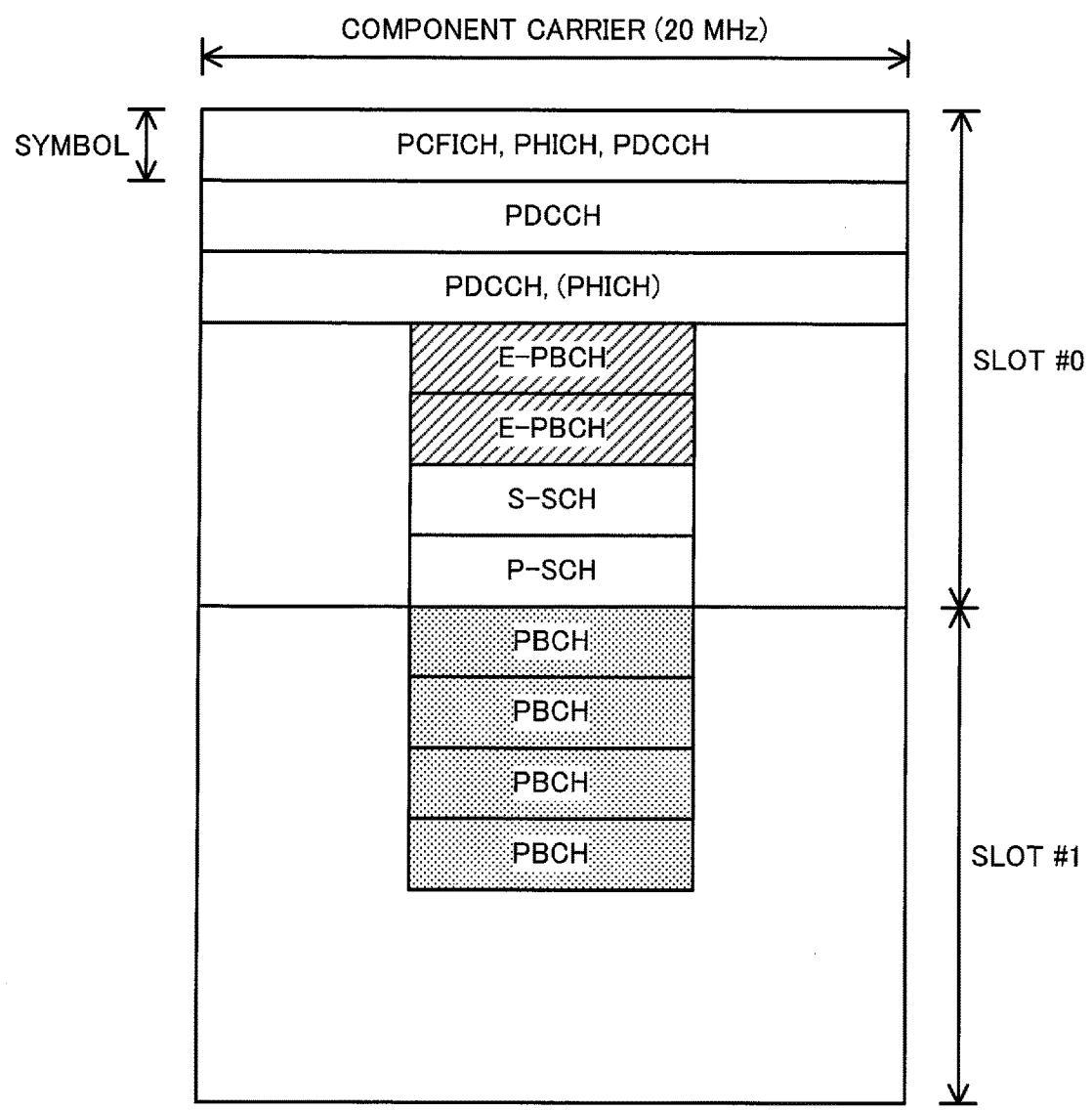
FIG. 9 illustrates a second example of assigning the extended physical broadcast channel.

FIG. 9 illustrates a second example of assigning the extended physical broadcast channel. The assigning example of FIG. 9 is the same as the example illustrated in FIG. 8 except for the location in which the E-PBCH is set. According to the example of FIG. 9, the E-PBCH is assigned to the fourth and fifth symbols of Slot #0. In the wireless resource region, the E-PBCH is adjacent to the S-SCH in the time direction. Frequencies assigned to the E-PBCH may be the same as, or different from, those assigned to the S-SCH.

Figure 10:
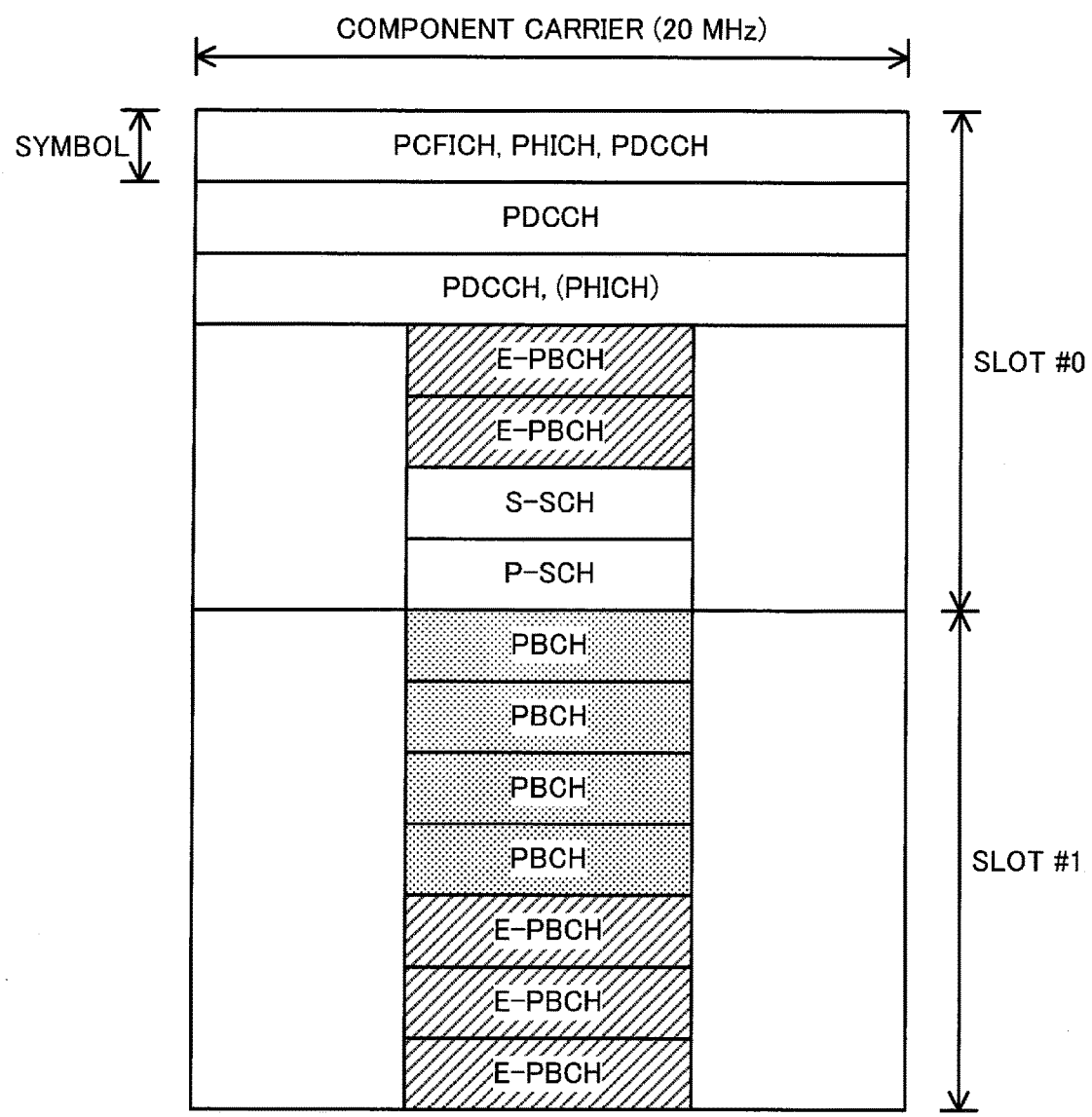
FIG. 10 illustrates a third example of assigning the extended physical broadcast channel.

FIG. 10 illustrates a third example of assigning the extended physical broadcast channel. The assigning example of FIG. 10 is the same as the examples illustrated in FIGS. 8 and 9 except for the location in which the E-PBCH is set. According to the example of FIG. 10, the E-PBCH is assigned to both the fourth and fifth symbols of Slot #0 and the fifth to seventh symbols of Slot #1. In the wireless resource region, the E-PBCH is adjacent to the S-SCH and the PBCH in the time direction. Frequencies assigned to the E-PBCH may be the same as, or different from, those assigned to the S-SCH and the PBCH.

An increase in the amount of wireless resources assigned to the E-PBCH in the above-described manner allows more extended broadcast information to be transmitted. Wireless resources assigned to the E-PBCH may be made variable according to the amount of extended broadcast information to be transmitted. In addition, as illustrated in FIGS. 8 to 10, setting the E-PBCH adjacent to at least one of the synchronization channel and the PBCH in the time direction facilitates the mobile station 300 to detect the E-PBCH. Note however that the adjacency setting may be made not in the time direction but in the frequency direction. In addition, the E-PBCH may be set to be adjacent to none of the synchronization channel and the PBCH. Note that the E-PBCH may be provided for each of all the CCs, or may be provided for only some of the CCs.

FIGS. 8 to 10 above take as an example the case of using a normal CP as the CP (i.e., the case where 7 symbols are included in one slot). However, also in the case of using an extended CP as the CP (the case where 6 symbols are included in one slot), the E-PBCH may be set based on similar considerations. In that case, the E-PBCH is assigned to, for example, the fifth and sixth symbols of Slot #1 in the method of FIG. 8; the fourth symbol of Slot #0 in the method of FIG. 9; and the fourth symbol of Slot #0 and the fifth and sixth symbols of Slot #1 in the method of FIG. 10.

Figure 11:
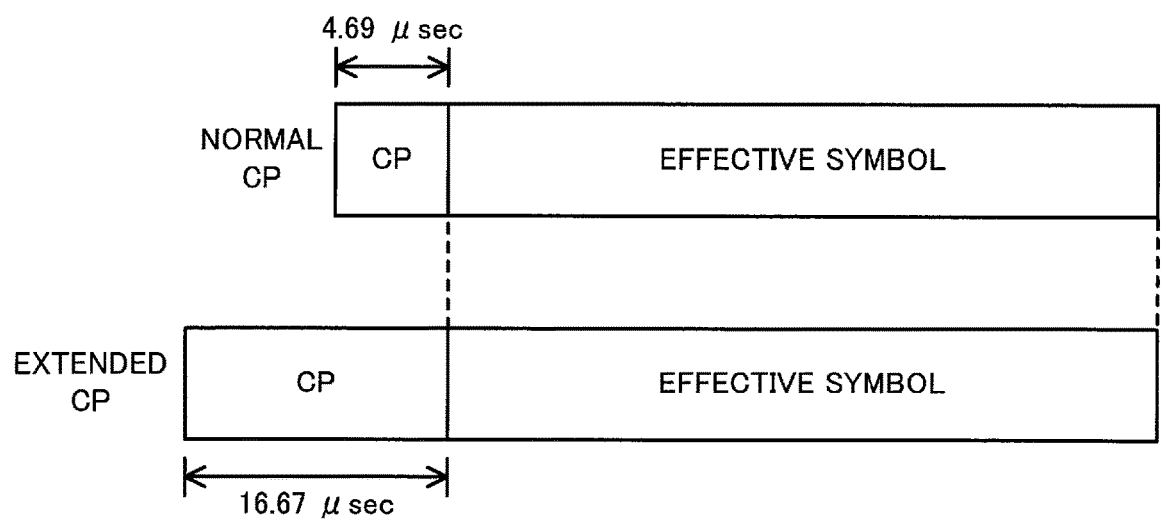
FIG. 11 illustrates a structural example of a symbol.

FIG. 11 illustrates a structural example of a symbol. As described above, there are two types of CPs, a normal CP and an extended CP. As illustrated in FIG. 11, a CP is inserted in front of an effective symbol which is a data portion. The CP is a duplication of a signal located at the end of the effective symbol. The time length of a normal CP is 4.69 μsec, and that of an extended CP is 16.67 μsec. The effective symbol length for one symbol is the same both in the case of using a normal CP and in the case of using an extended CP. An extended CP is used, for example, in an MBSFN subframe (i.e., a subframe used for MBSFN transmission). In this case, the MBSFN subframe includes 6 symbols including an effective symbol and a CP. A normal CP is used, for example, in a non-MBSFN subframe (a subframe not used for MBSFN transmission). In this case, the non-MBSFN subframe includes 7 symbols.

Figure 12:
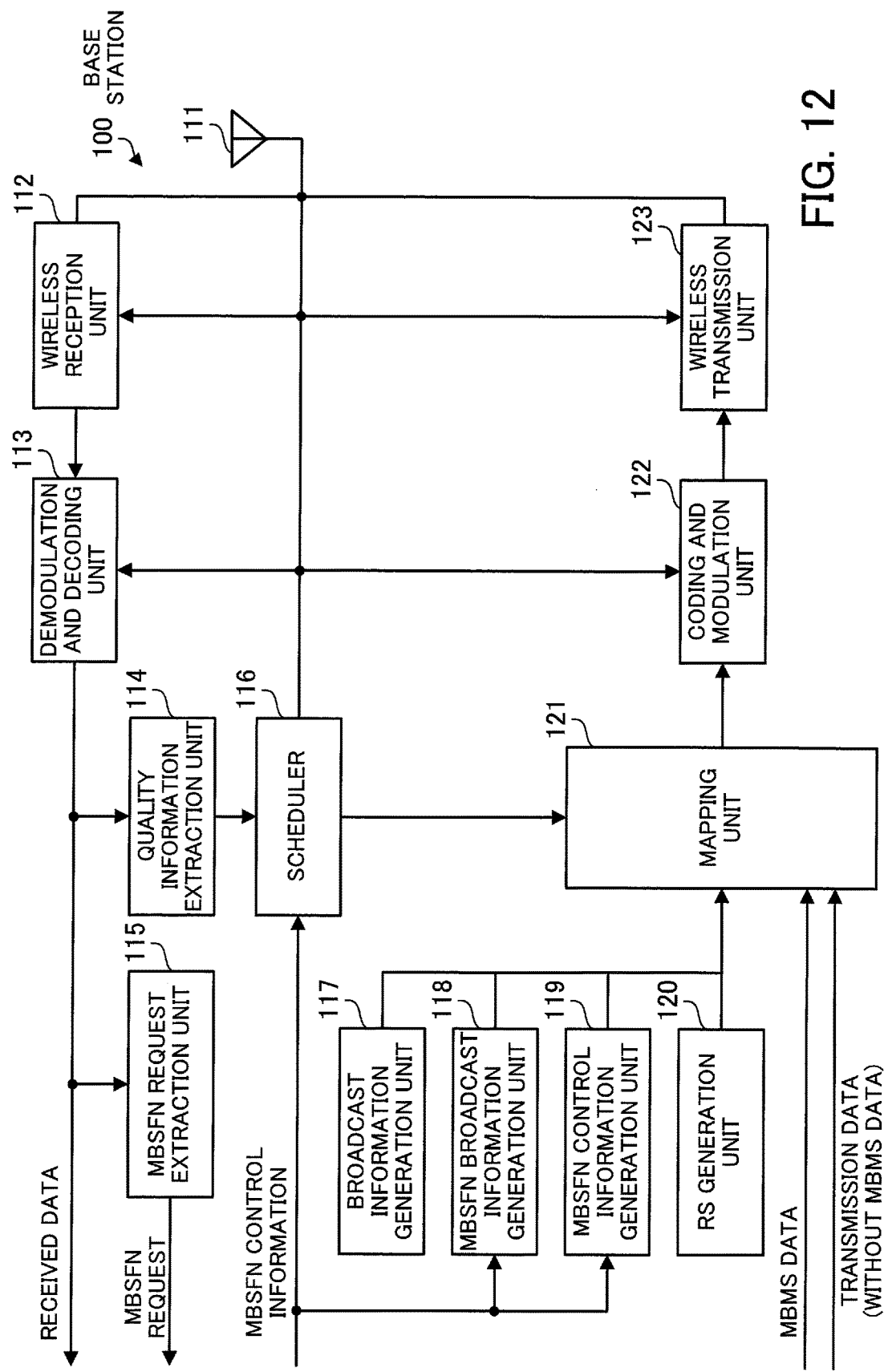
FIG. 12 is a block diagram of a base station according to the second embodiment.

FIG. 12 is a block diagram of a base station according to the second embodiment. The base station 100 includes a transmitting and receiving antenna 111; a wireless reception unit 112; a demodulation and decoding unit 113; a quality information extraction unit 114; an MBSFN request extraction unit 115; a scheduler 116; a broadcast information generation unit 117; an MBSFN broadcast information generation unit 118; an MBSFN control information generation unit 119; an RS generation unit 120; a mapping unit 121; a coding and modulation unit 122; and a wireless transmission unit 123. Note that the base station 200 is also implemented using the same modular architecture as the base station 100.

The transmitting and receiving antenna 111 receives a wireless signal transmitted by the mobile station 300 and outputs the wireless signal to the wireless reception unit 112. In addition, the transmitting and receiving antenna 111 outputs a transmission signal acquired from the wireless transmission unit 123. Note that, instead of the two-way transmitting and receiving antenna, a transmitting antenna and a receiving antenna may be separately provided in the base station 100. In addition, diversity transmission may be employed using a plurality of transmitting and receiving antennas. The wireless reception unit 112 performs wireless signal processing on the signal acquired from the transmitting and receiving antenna 111 and converts the high-frequency wireless signal into a baseband signal as a low-frequency signal (down-conversion). For the wireless signal processing, the wireless reception unit 112 includes, for example, a Low Noise Amplifier (LNA), a frequency converter, a Band Pass Filter (BPF), an A/D (Analog to Digital) converter. Frequency bands for reception are notified of by the scheduler 116. The demodulation and decoding unit 113 demodulates and error-correction-decodes the baseband signal acquired from the wireless reception unit 112, and then outputs obtained data (including user data and control information). The demodulation and decoding are performed by methods corresponding to a predetermined Modulation and Coding Scheme (MCS) or an MCS notified of by the scheduler 116. Choices for the modulation scheme include digital modulation schemes such as QPSK (Quadrature Phase Shift Keying) and 16QAM (Quadrature Amplitude Modulation) and the like. Choices for the coding scheme include turbo coding, Low Density Parity Check (LDPC) coding, and the like. The extracted user data is transferred to the gateway 430. The quality information extraction unit 114 extracts a wireless quality measurement report which is one type of control information transmitted by the mobile station 300. Subsequently, the quality information extraction unit 114 outputs the extracted measurement report to the scheduler 116.

The MBSFN request extraction unit 115 extracts an MBSFN request (control information indicating a request for MBSFN transmission) transmitted by the mobile station 300. The MBSFN request is transmitted by a Physical Uplink Shared CHannel (PUSCH) provided in a UL radio frame. The MBSFN request extraction unit 115 outputs the extracted MBSFN request to a module (not shown) for implementing an MCE control function, provided in the base station 100.

The scheduler 116 allocates wireless resources to the mobile station 300 based on the measurement report acquired from the quality information extraction unit 114. Subsequently, the scheduler 116 notifies the wireless reception unit 112 of the wireless resource allocation status, the demodulation and decoding unit 113, the mapping unit 121, the coding and modulation unit 122, and the wireless transmission unit 123. In addition, the scheduler 116 adaptively selects an MCS based on the measurement report. Then, the scheduler 116 notifies the demodulation and decoding unit 113 and the coding and modulation unit 122 of the selected MCS. The broadcast information generation unit 117 generates, with respect to each CC, broadcast information to be transmitted (broadcast) by the PBCH. The broadcast information includes, for example, information indicating a frequency bandwidth of the corresponding CC. The MBSFN broadcast information generation unit 118 generates information indicating, among CCs #1 to #5, one or more CCs to be used for the MBSFN transmission. The broadcast information is transmitted, for example, by the E-PBCH. The MBSFN control information generation unit 119 generates control information related to the MBSFN transmission. The control information includes information indicating an MCS and a transmission timing of MBMS data. The control information is transmitted by a Physical Multicast CHannel (PMCH) provided in a DL radio frame. The RS generation unit 120 generates a reference signal which is a known signal. Note that the broadcast information generated by the MBSFN broadcast information generation unit 118 may be broadcast by a channel other than the E-PBCH. For example, the broadcast information may be broadcast by the PBCH. Alternatively, the broadcast information may be broadcast using the channel (PMCH) by which control information of the MBSFN transmission is transmitted.

The mapping unit 121 maps, in a DL radio frame, MBMS data received from the MBMS gateway 420 and user data received from the gateway 430. In addition, the mapping unit 121 maps, in a DL radio frame, control information or control signals generated by the broadcast information generation unit 117, the MBSFN broadcast information generation unit 118, the MBSFN control information generation unit 119, and the RS generation unit 120. Subsequently, the mapping unit 121 successively outputs the mapped data to the coding and modulation unit 122. The coding and modulation unit 122 error-correction-codes and modulates the data acquired from the mapping unit 121, and generates a baseband signal to be a transmission signal and then outputs the baseband signal to the wireless transmission unit 123. For the coding and modulation, a predetermined MCS or an MCS notified of by the scheduler 116 is used. Choices for the modulation scheme include digital modulation schemes such as QPSK and 16QAM and the like. Choices for the coding scheme include turbo coding and LDPC coding. The wireless transmission unit 123 performs wireless signal processing on the transmission signal acquired from the coding and modulation unit 122 and converts the baseband signal as a low-frequency signal into a high-frequency wireless signal (up-conversion). For the wireless signal processing, the wireless transmission unit 123 includes, for example, a D/A (Digital to Analog) converter, a frequency converter, a BPF, and a power amplifier. Frequency bands for transmission are notified of by the scheduler 116.

Figure 13:
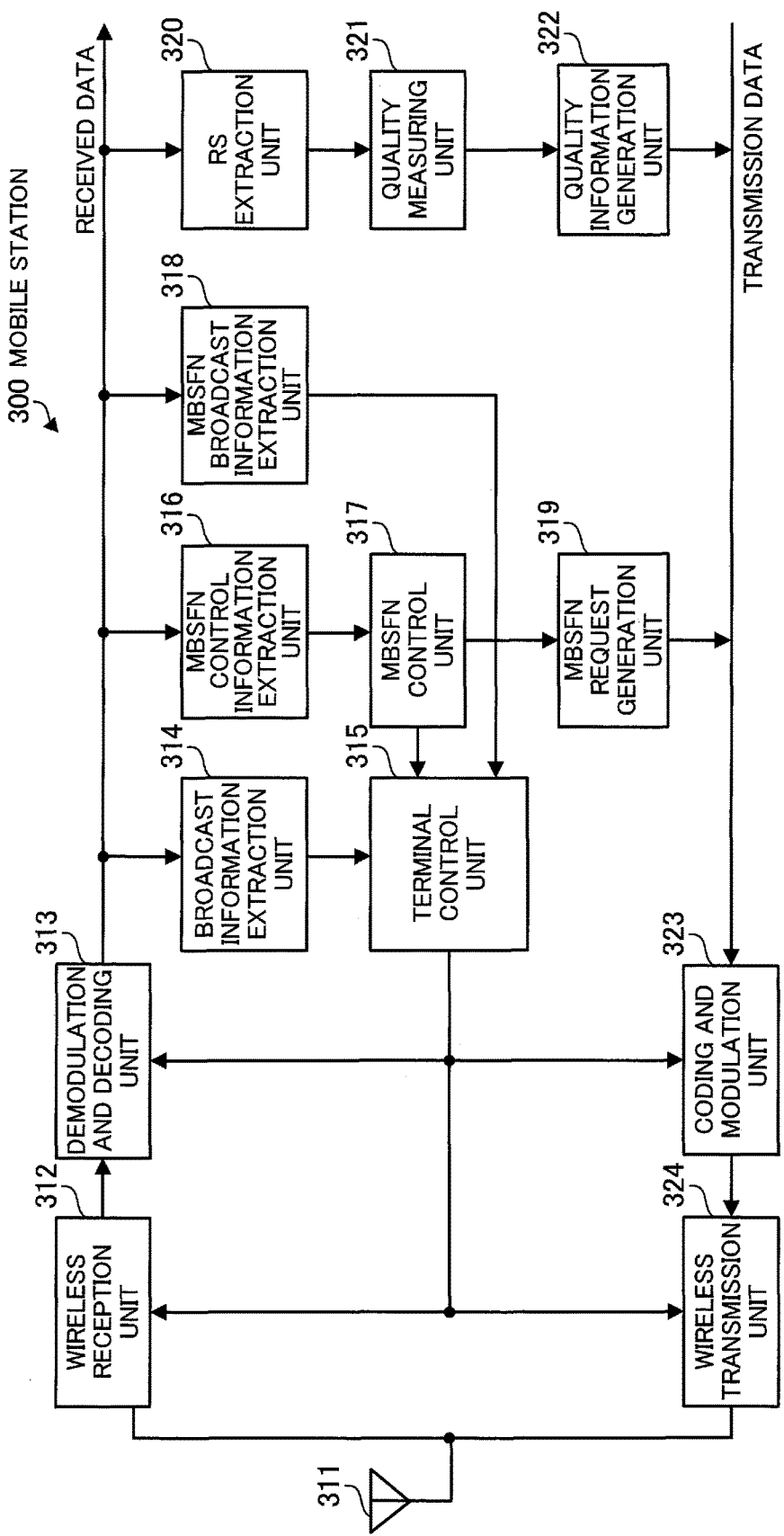
FIG. 13 is a block diagram of a mobile station according to the second embodiment.

FIG. 13 is a block diagram of a mobile station according to the second embodiment. The mobile station 300 includes a transmitting and receiving antenna 311; a wireless reception unit 312; a demodulation and decoding unit 313; a broadcast information extraction unit 314; a terminal control unit 315; an MBSFN control information extraction unit 316; an MBSFN control unit 317; an MBSFN broadcast information extraction unit 318; an MBSFN request generation unit 319; an RS extraction unit 320; a quality measuring unit 321; a quality information generation unit 322; a coding and modulation unit 323; and a wireless transmission unit 324.

The transmitting and receiving antenna 311 receives wireless signals transmitted by the base stations 100 and 200, and then outputs the received signals to the wireless reception unit 312. In addition, the transmitting and receiving antenna 311 outputs a transmission signal acquired from the wireless transmission unit 324. Note that, instead of the two-way transmitting and receiving antenna, a transmitting antenna and a receiving antenna may be separately provided in the mobile station 300. In addition, diversity transmission may be employed using a plurality of transmitting and receiving antennas. The wireless reception unit 312 performs wireless signal processing on the signal acquired from the transmitting and receiving antenna 311 and converts the high-frequency wireless signal into a baseband signal as a low-frequency signal (down-conversion). For the wireless signal processing, the wireless reception unit 312 includes, for example, an LNA, a frequency converter, a BPF, an A/D converter. Frequency bands for reception are notified of by the terminal control unit 315. The demodulation and decoding unit 313 demodulates and error-correction-decodes the baseband signal acquired from the wireless reception unit 312, and then outputs obtained data (including user data and control information). The demodulation and decoding are performed by methods corresponding to a predetermined MCS or an MCS notified of by the terminal control unit 315. At this point, in the case where the base stations 100 and 200 have performed MBSFN transmission, the received signal has been formed by superimposing a signal transmitted by the base station 100 and a signal transmitted by the base station 200. Although both the signals have the same data, one signal may be delayed compared with the other signal depending on the propagation distance to the mobile station 300. That is, to the mobile station 300, the received signal appears to be a direct wave and a delay wave superimposed on each other. In this case, if the delay is equal to or less than the CP length, the wireless reception unit 312 is able to also extract a signal corresponding to the delay wave. The demodulation and decoding unit 313 demodulates and decodes the extracted signal which has been formed by combining signals transmitted from each of the base stations 100 and 200. In this manner, the mobile station 300 is able to improve reception quality.

The broadcast information extraction unit 314 extracts, with respect to each CC, the broadcast information broadcast by the base stations 100 and 200 using the PBCH. The broadcast information includes, for example, information indicating a frequency bandwidth of the CC with which the broadcast information is transmitted. The broadcast information extraction unit 314 outputs the extracted broadcast information to the terminal control unit 315. With reference to the broadcast information extracted by the broadcast information extraction unit 314, the terminal control unit 315 controls connection to the base station 100. In addition, before requesting the base station 100 for the MBSFN transmission, the terminal control unit 315 determines one or more available CCs for the MBSFN transmission based on the broadcast information acquired from the MBSFN broadcast information extraction unit 318. Further, the terminal control unit 315 determines an MCS and a reception timing to be applied to MBMS data based on information notified of by the MBSFN control unit 317. Subsequently, the terminal control unit 315 controls operations of the wireless reception unit 312, the demodulation and decoding unit 313, the coding and modulation unit 323, and the wireless transmission unit 324. The MBSFN control information extraction unit 316 extracts the control information related to the MBSFN transmission transmitted by the base station 100 using the PMCH. The control information includes, for example, information indicating an MCS and a transmission timing to be applied to the MBMS data. The MBSFN control information extraction unit 316 outputs the extracted control information to the MBSFN control unit 317. The MBSFN control unit 317 controls MBSFN reception processing. Specifically, when starting the MBSFN reception processing, the MBSFN control unit 317 instructs the MBSFN request generation unit 319 to transmit an MBSFN request. In addition, the MBSFN control unit 317 notifies the terminal control unit 315 of content of the control information extracted by the MBSFN control information extraction unit 316. The MBSFN broadcast information extraction unit 318 extracts extended broadcast information broadcast by the base station 100 using the E-PBCH. The extended broadcast information includes information indicating, among CCs #1 to #5, one or more available CCs for the MBSFN transmission. The MBSFN broadcast information extraction unit 318 outputs the extracted extended broadcast information to the terminal control unit 315. Note that in the case where the information indicating available CCs is broadcast through a channel other than the E-PBCH (for example, the PBCH or the PMCH), the MBSFN broadcast information extraction unit 318 extracts the broadcast information from the channel. In response to an instruction from the MBSFN control unit 317, the MBSFN request generation unit 319 generates an MBSFN request, that is, control information indicating a request to start MBSFN transmission. Via the coding and modulation unit 323 and the wireless transmission unit 324, the generated MBSFN request is transmitted, for example, by the PUSCH provided in one or more available CCs for the MBSFN transmission.

The RS extraction unit 320 extracts reference signals transmitted by the base stations 100 and 200. Subsequently, the RS extraction unit 320 outputs the extracted reference signals to the quality measuring unit 321. Using the reference signals extracted by the RS extraction unit 320, the quality measuring unit 321 measures reception quality of each of CCs #1 to #5. Subsequently, the quality measuring unit 321 notifies the quality information generation unit 322 of the measurement result. As an index indicating the reception quality, an SINR (Signal to Interference and Noise Ratio) may be used, for example. The quality information generation unit 322 generates control information (measurement report) indicating the reception quality measured by the quality measuring unit 321. As a measurement report, a CQI (Channel Quality Indication) which expresses the reception quality using a discrete value may be used, for example.

The coding and modulation unit 323 error-correction-codes and modulates user data to be transmitted to the base stations 100 and 200, the MBSFN request generated by the MBSFN request generation unit 319, and the measurement report generated by the quality information generation unit 322, and also maps these items in UL wireless resources allocated to the mobile station 300. For the coding and modulation, a predetermined MCS or an MCS notified of by the terminal control unit 315 is used. Subsequently, the coding and modulation unit 323 outputs a baseband signal as a transmission signal to the wireless transmission unit 324. The wireless transmission unit 324 performs wireless signal processing on the transmission signal acquired from the coding and modulation unit 323 and converts the baseband signal as a low-frequency signal into a high-frequency wireless signal (up-conversion). For the wireless signal processing, the wireless transmission unit 324 includes, for example, a D/A converter, a frequency converter, a BPF, and a power amplifier. Frequency bands for transmission are notified of by the terminal control unit 315.

Figure 14:
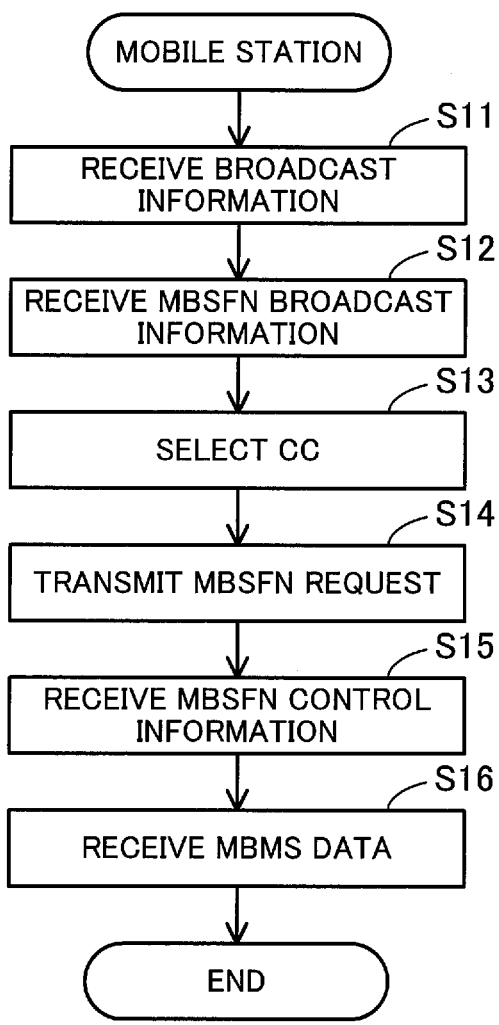
FIG. 14 is a flowchart illustrating a mobile station process according to the second embodiment.

FIG. 14 is a flowchart illustrating a mobile station process according to the second embodiment. Here, a case is considered where the mobile station 300 makes an MBSFN request to the base station 100. An MBSFN request is made by the mobile station, for example, at the time of using a service involving MBSFN transmission (at the time of establishing a service flow). A video distribution service is an example of such a service involving MBSFN transmission.

(Step S11) The mobile station 300 receives broadcast information broadcast by the base station 100 using the PBCH of each of CCs #1 to #5. The broadcast information includes information to be used by the mobile station 300 to set up a connection to each CC.

(Step S12) The mobile station 300 receives broadcast information related to MBSFN transmission, which is broadcast by the base station 100 using the E-PBCH (or another channel, such as the PBCH and the PMCH) of at least one CC. The broadcast information includes information indicating, among CCs #1 to #5, one or more available CCs for the MBSFN transmission.

(Step S13) The mobile station 300 uses the broadcast information related to the MBSFN transmission received in Step S12 and selects a CC to be used for the MBSFN transmission. That is, the mobile station 300 selects one CC from among the one or more CCs notified of by the base station 100 to be available for the MBSFN transmission. In the case where available CCs are notified of, the mobile station 300 may select one CC by referring to reception quality of the individual CCs.

(Step S14) The mobile station 300 transmits, to the base station 100, an MBSFN request using the PUSCH of the CC selected in Step S13. Note however that the MBSFN request may be transmitted not using the CC selected in Step S13, but a CC currently used by the mobile station 300.

(Step S15) The mobile station 300 receives control information of the MBSFN transmission transmitted by the base station 100 using the PMCH of the CC selected in Step S13. The control information includes information indicating, for example, an MCS and a transmission timing to be applied to the MBSFN transmission. Note that the control information is included in an MCCH (MBMS point-to-multipoint Control CHannel) and an MSCH (MBMS point-to-multipoint Scheduling CHannel) which are logical channels.

(Step S16) The mobile station 300 uses the control information received in Step S15 and receives MBMS data using the PMCH of the CC selected in Step S13. That is, the mobile station 300 receives signals of the same content transmitted by the base stations 100 and 200 at the same timing using the same frequency, then combines the signals and extracts the MBMS data. Note that the MBMS data is included in an MTCH (MBMS point-to-multipoint Traffic CHannel) which is a logical channel.

In the above-described manner, the mobile station 300 recognizes one or more available CCs for the MBSFN transmission by using information broadcast by the base station 100. With this, the mobile station 300 is able to efficiently perform a procedure to start the MBSFN transmission.

Figure 15:
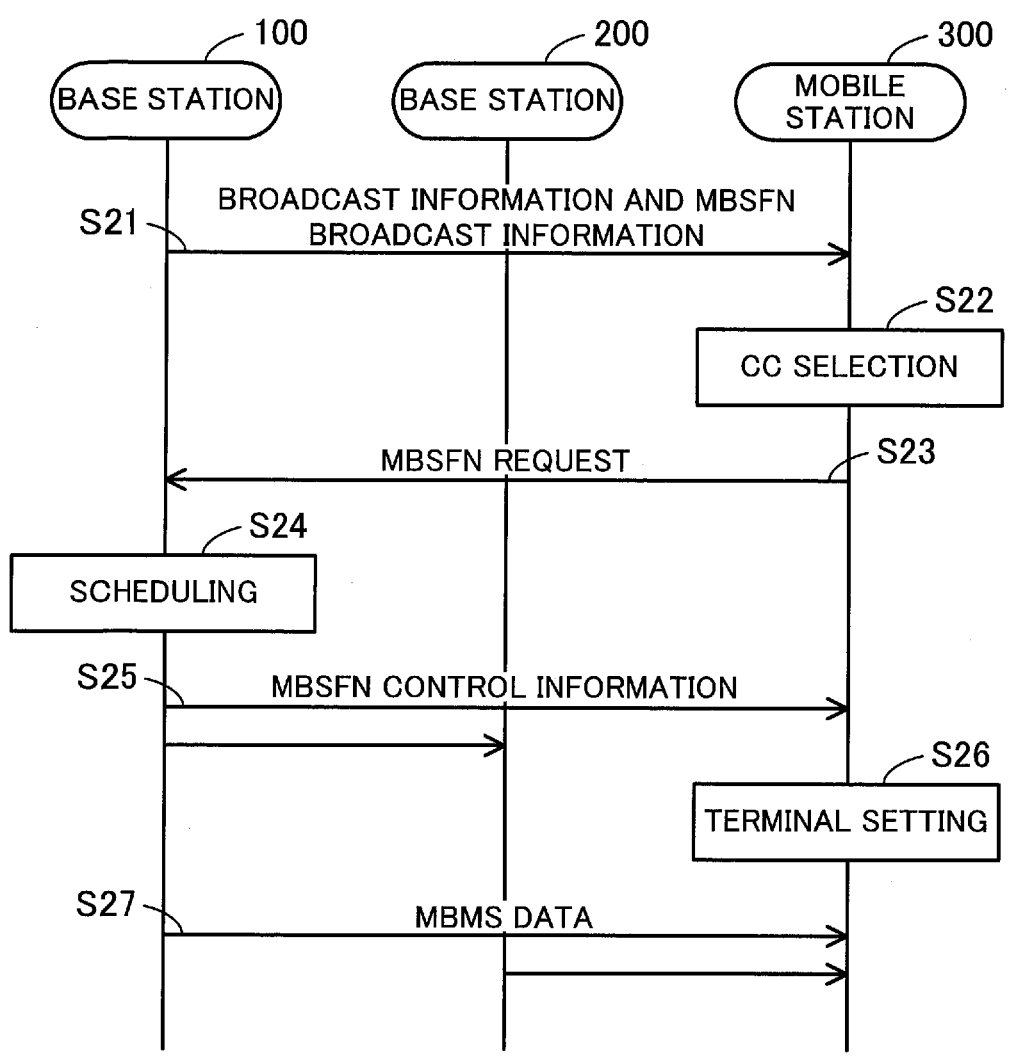
FIG. 15 is a sequence diagram illustrating an example of MBSFN control according to the second embodiment.

FIG. 15 is a sequence diagram illustrating an example of MBSFN control according to the second embodiment. The sequence example of FIG. 15 represents a case in which the base station 100 initiatively performs MBSFN transmission with the base station 200.

(Step S21) The base station 100 transmits broadcast information using the PBCH. In addition, the base station 100 transmits broadcast information related to the MBSFN transmission using the E-PBCH (or a different predetermined channel). The mobile station 300 detects the PBCH and the E-PBCH (or the different predetermined channel) and extracts the broadcast information transmitted by the base station 100.

(Step S22) Based on the broadcast information related to the MBSFN transmission, the mobile station 300 identifies, among CCs #1 to #5, one or more available CCs for the MBSFN transmission. Then, the mobile station 300 selects a CC to be used for receiving MBMS data.

(Step S23) The mobile station 300 transmits an MBSFN request to the base station 100 using the PUSCH of the selected CC (or a CC that the mobile station 300 currently uses). The base station 100 extracts the MBSFN request transmitted by the mobile station 300.

(Step S24) In response to the MBSFN request from the mobile station 300, the base station 100 performs control as an MCE. That is, the base station 100 performs scheduling and determines a range of base stations for performing the MBSFN transmission, an MCS to be applied to MBMS data, a transmission timing and so on.

(Step S25) The base station 100 transmits, to the mobile station 300, control information related to the MBSFN transmission using the PMCH of the CC used for the MBSFN transmission. The control information includes information indicating the MCS and the transmission timing. The mobile station 300 detects the PMCH and extracts the control information transmitted by the base station 100. In addition, the base station 100 notifies the base station 200 of the same content as the control information.

(Step S26) Based on the control information related to the MBSFN transmission received from the base station 100, the mobile station 300 makes appropriate setting therein to receive MBMS data from the base stations 100 and 200.

(Step S27) According to the scheduling results of the base station 100, the base stations 100 and 200 transmit the MBMS data received from the gateway 430 to the mobile station 300 using the PMCH. The mobile station 300 combines signals received from the base stations 100 and 200 and extracts the MBMS data.

In the above-described manner, the mobile station 300 requests MBSFN transmission to the base station 100 at the start of a service involving MBSFN transmission. In this regard, the mobile station 300 determines an available CC for the MBSFN transmission based on broadcast information and transmits an MBSFN request using, for example, the determined CC. The base station 100 functions as an MCE and performs scheduling of the MBSFN transmission. Then, the base stations 100 and 200 transmit MBMS data in a coordinated manner to the mobile station 300. This improves reception quality at the mobile station 300. Note that the mobile station 300 may or may not explicitly indicate a request for receiving the MBMS data by the MBSFN transmission. That is, the "MBSFN request" transmitted by the mobile station 300 may be control information for explicitly requesting the MBSFN transmission, or may be simply a request for starting some sort of service. In the latter case, the base station 100 determines whether the service requested by the mobile station 300 is a service involving MBSFN transmission.

Figure 16:
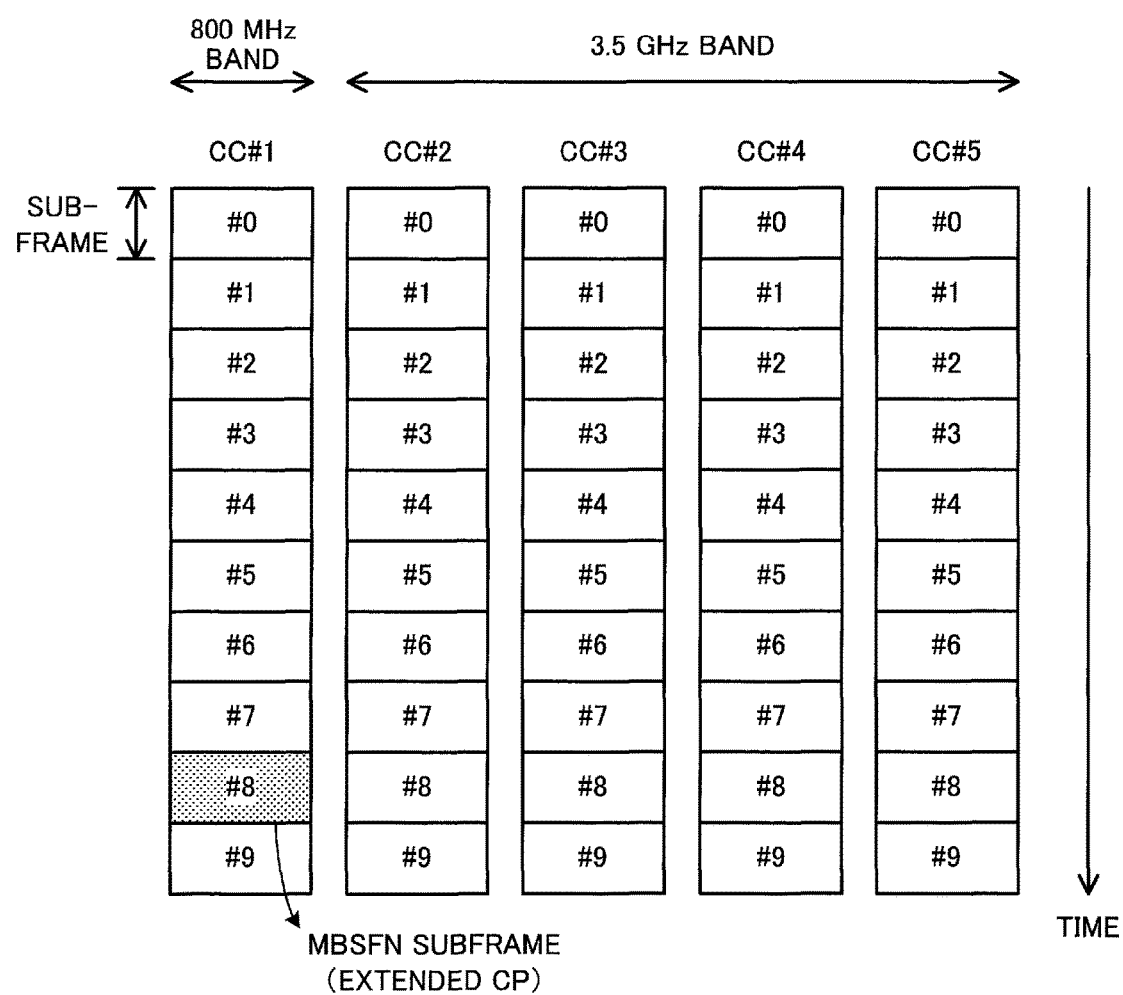
FIG. 16 illustrates an example of allocating an MBSFN subframe.

FIG. 16 illustrates an example of allocating an MBSFN subframe. The base station 100 performs scheduling of wireless resources, for example, as illustrated in FIG. 16. According to the example, CC #1 belonging to the 800 MHz band and CCs #2 to #5 belonging to the 3.5 GHz band are provided. Among CCs #1 to #5, CC #1 has been notified of as an available CC for the MBSFN transmission. That is, the broadcast information broadcast using the E-PBCH (or a different predetermined channel) includes information indicating CC #1 (for example, the ID of CC #1). In addition, among DL radio frames of CC #1, Subframe #8 has been notified of as an MBSFN subframe. An extended CP is used for Subframe #8 of CC #1, and normal CPs are used for the remaining subframes. Note that the number of MBSFN subframes and their positions may be dynamically changed according to the communication conditions of a mobile station connected to the base station 100.

Here, a case is considered in which a non-MBSFN subframe is able to accommodate 10 mobile stations and one of ten subframes included in radio frames is used as an MBSFN subframe. Also, assume that five mobile stations use the MBSFN. In this case, each of CCs #2 to #5 accommodates up to 100 mobile stations (=10×10) which do not use the MBSFN. In addition, CC #1 accommodates up to 90 mobile stations (=9×10) which do not use the MBSFN and 5 mobile stations which use the MBSFN. That is, in the example of FIG. 16, CCs #1 to #5 all together are able to accommodate up to 495 mobile stations. On the other hand, assume that the base station 100 does not limit an available CC for the MBSFN transmission and, therefore, the five mobile stations are able to use the MBSFN utilizing arbitrary CCs. Here, the worst-case scenario is considered in which each of CCs #1 to #5 accommodates one mobile station which uses the MBSFN. In this case, since an MBSFN subframe is not able to accommodate mobile stations which do not use the MBSFN transmission, each of CCs #1 to #5 accommodates up to 90 mobile stations (=9×10) which do not use the MBSFN. That is, CCs #1 to #5 all together are able to accommodate up to 455 stations. According to the above-described specific example, the efficiency in wireless resource use is improved by about 8.8% (=(495−455)÷455×100) by limiting an available CC for the MBSFN transmission, as compared to the case of not imposing such a limitation. Thus, by limiting an available CC for the MBSFN transmission, it is possible to improve the efficiency in wireless resource use. In addition, the MBSFN transmission is performed using the CC with the lowest frequency band. With this, a wireless signal including MBMS data propagates farther. That is, the mobile station 300 receive wireless signals including MBMS data from many more base stations, and therefore is able to further improve reception quality by combining many reception signals.

Figure 17:
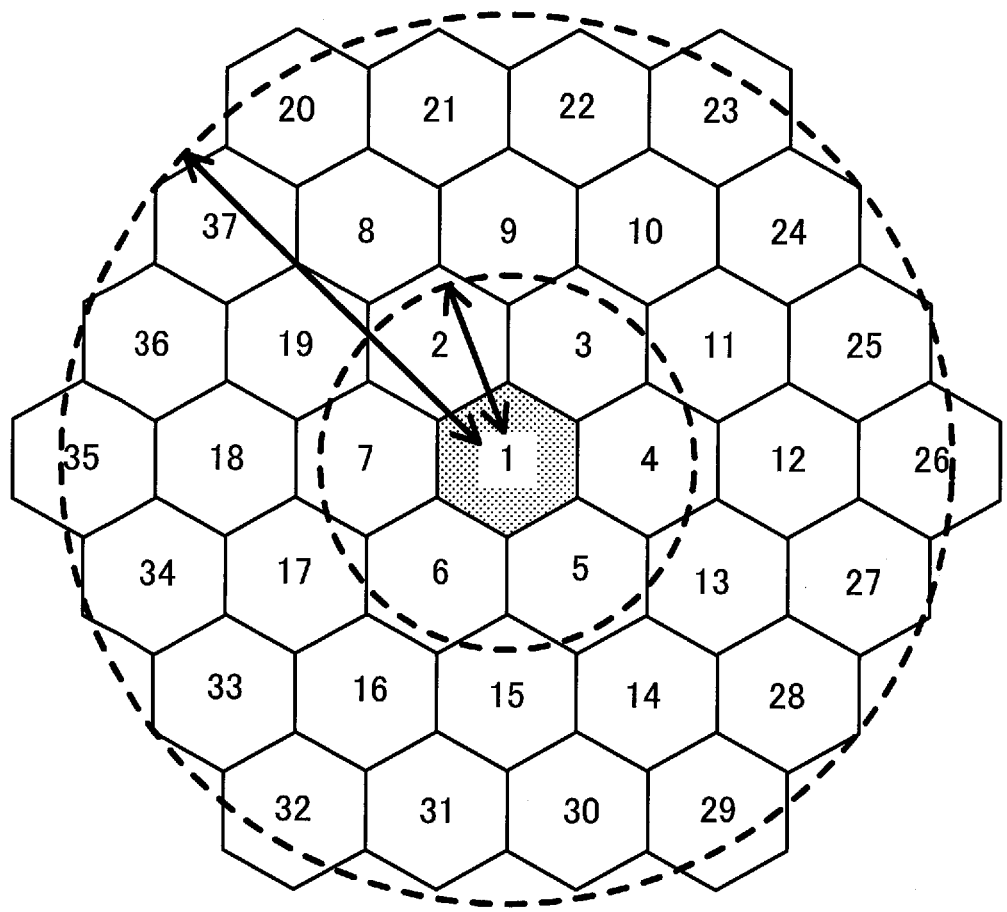
FIG. 17 illustrates a model for calculating the number of signals to be combined in MBSFN.

FIG. 17 illustrates a model for calculating the number of signals to be combined in the MBSFN transmission. Assume here that 37 cells (Cells #1 to #37) are provided in a mobile communications system and the mobile station 300 exists in Cell #1. Assume also that a wireless signal propagates a distance corresponding to one cell in the case of performing communication in the 3.5 GHz band. In this case, when performing communication in the 3.5 GHz band, the mobile station 300 receives a wireless signal of Cell #1, in which the mobile station 300 exists, and wireless signals of six cells (Cells #2 to #7) adjacent to Cell #1. On the other hand, when communication is performed in the 800 MHz band, a wireless signal propagates a distance about three times (i.e., exp(4÷3.5)=about 3.14) more than the case of performing communication in the 3.5 GHz band. That is, when performing communication in the 800 MHz band, the mobile station 300 is able to receive a wireless signal of Cell #1, in which the mobile station 300 exists, and wireless signals of 36 cells (Cells #2 to #37) which are located within a distance corresponding to three cells from Cell #1. According to the above-described specific example, in the case of using the MBSFN utilizing the 3.5 GHz band wireless resources, the mobile station 300 extracts MBMS data by combining signals transmitted from up to seven base stations. On the other hand, in the case of using the MBSFN utilizing the 800 MHz band wireless resources, the mobile station is able to extract MBMS data by combining signal transmitted from up to 37 base stations. Thus, by receiving the MBMS data utilizing the low frequency wireless resources, it is possible to further improve reception quality at the mobile station 300.

According to such a mobile communications system of the second embodiment, the base station 100 limits an available CC for the MBSFN transmission so that wireless resources used for the MBSFN transmission do not spread over CCs #1 to #5. This improves the efficiency in wireless resource use in a communication environment where normal data transmission and MBSFN transmission exist together. In addition, since the base station 100 broadcasts information indicating one or more available CCs for the MBSFN transmission, the mobile station 300 efficiently performs a process of starting a service involving MBSFN transmission by using the broadcast information. In addition, the base station 100 performs the MBSFN transmission using, among CCs #1 to #5, CC #1 which is the lowest frequency band, which further improves reception quality at the mobile station 300. Note that the information indicating one or more available CCs for the MBSFN transmission may be broadcast, for example, using an extended broadcast channel, as described above. The extended broadcast channel may be used to transmit not only the information related to MBSFN transmission but also various types of information required to be broadcast to LTE-A mobile stations. Such an "extended broadcast channel" may be referred to as a different name. For example, one of the conventional broadcast channel and the extended broadcast channel defined in the LTE may be referred to as a first broadcast channel, and the other may be referred to as a second broadcast channel.

(c) Third Embodiment

Next described is a third embodiment with reference to drawings. The following description will focus on differences from the second embodiment described above and description of common items will be omitted. A mobile communications system according to the third embodiment changes a CC to be used in the case where a CC currently used by a mobile station is different from an available CC for the MBSFN transmission. In the following description, the term "handover (HO)" is used to represent a change between CCs each belonging to a different frequency band as well as a change between CCs belonging to the same frequency band. The mobile communications system of the third embodiment may be achieved using the same system configuration as that of the mobile communications system of the second embodiment illustrated in FIG. 2. Note however that, in the third embodiment, a base station 100a and a mobile station 300a described below are used in place of the base station 100 and the mobile station 300 of the second embodiment.

Figure 18:
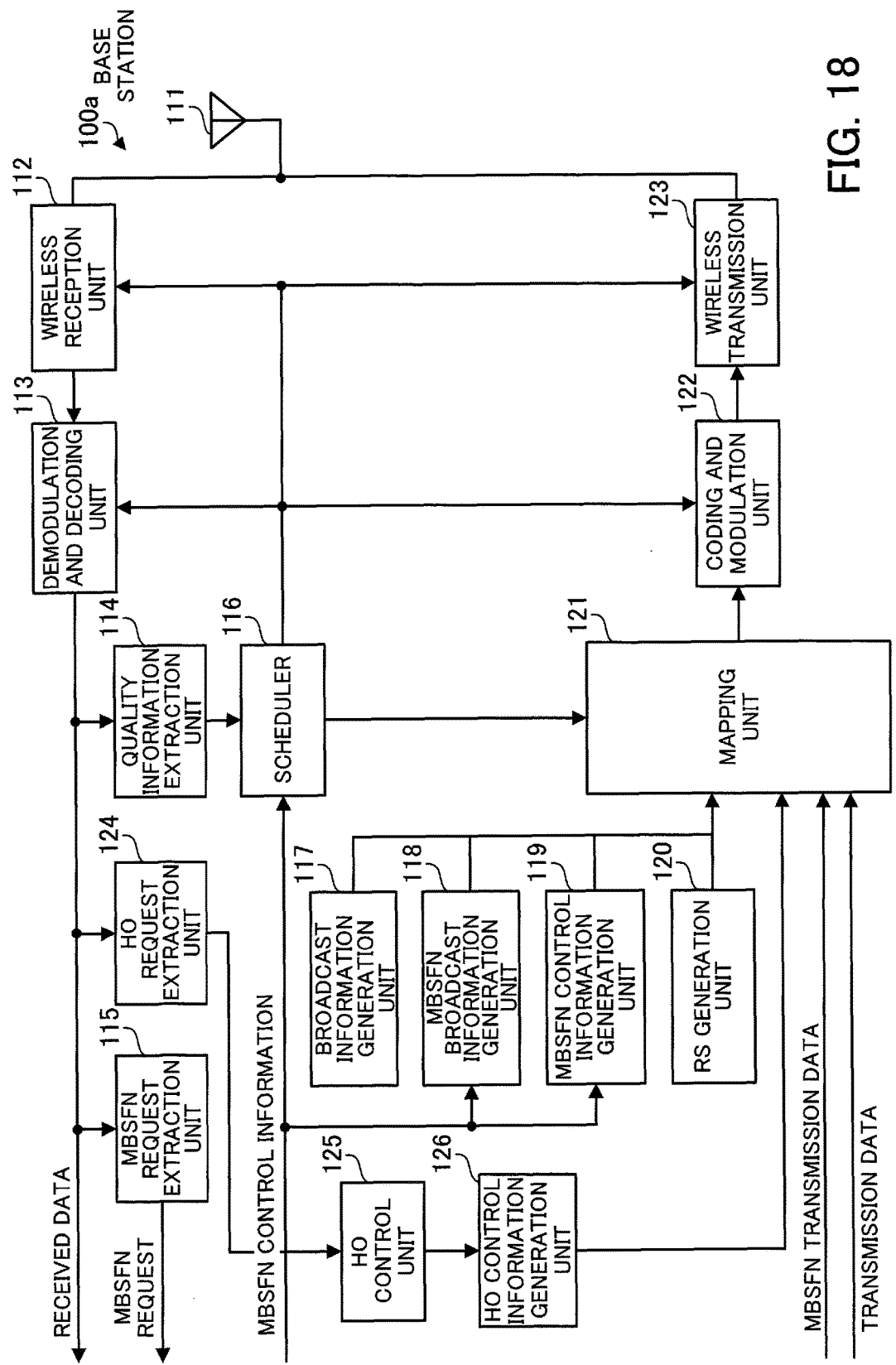
FIG. 18 is a block diagram of a base station according to a third embodiment.

FIG. 18 is a block diagram of a base station according to the third embodiment. The base station 100a includes, in addition to the modules included in the base station 100 of FIG. 12, an HO request extraction unit 124, an HO control unit 125, and an HO control information generation unit 126. The HO request extraction unit 124 extracts a handover request (HO request) transmitted by the mobile station 300a, that is, control information indicating a request for changing a CC. Then, the HO request extraction unit 124 outputs the extracted HO request to the HO control unit 125. In response to the HO request extracted by the HO request extraction unit 124, the HO control unit 125 controls change of a CC used by the mobile station 300a. In addition, the HO control unit 125 instructs the HO control information generation unit 126 to transmit a response to the HO request. In response to the instruction from the HO control unit 125, the HO control information generation unit 126 generates handover control information (HO control information) which is to be used as a response to the HO request. Subsequently, the HO control information generation unit 126 outputs the generated HO control information to the mapping unit 121. The HO control information is mapped in DL wireless resources at the mapping unit 121.

Figure 19:
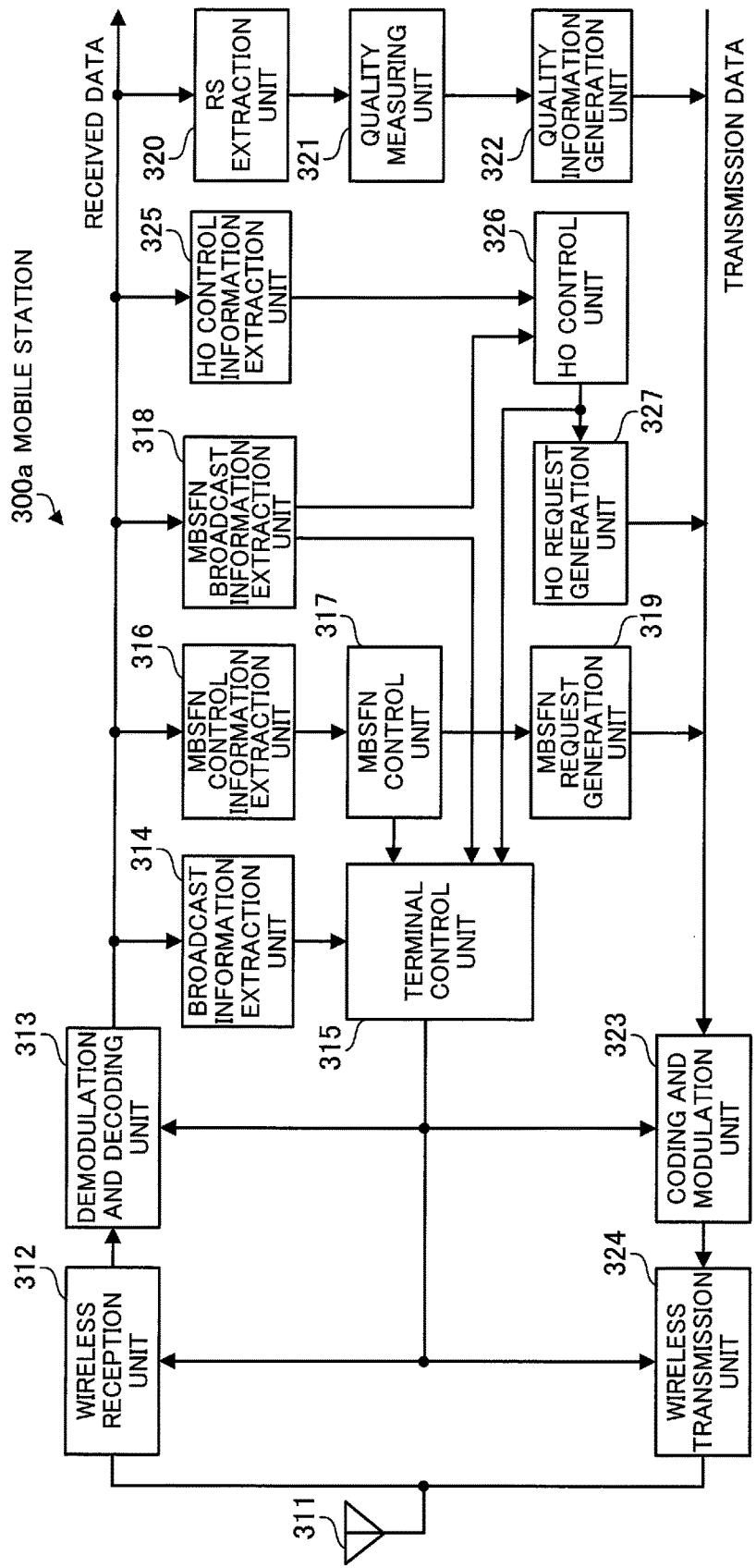
FIG. 19 is a block diagram of a mobile station according to the third embodiment.

FIG. 19 is a block diagram of a mobile station according to the third embodiment. The mobile station 300a includes, in addition to the modules included in the mobile station 300 of FIG. 13, an HO control information extraction unit 325, an HO control unit 326, and an HO request generation unit 327. The HO control information extraction unit 325 extracts the HO control information transmitted by the base station 100a, that is, control information which is a response to the HO request transmitted by the mobile station 300a to the base station 100a. Then, the HO control information extraction unit 325 outputs the extracted HO control information to the HO control unit 326. The HO control unit 326 controls a procedure of a handover between CCs (hereinafter, referred to as the "inter-CC handover"). Specifically, at the start of a service involving MBSFN transmission, the HO control unit 326 determines whether to perform an inter-CC handover or not by using the broadcast information extracted by the MBSFN broadcast information extraction unit 318. In the case where a CC currently used by the mobile station 300a to maintain a connection with the base station 100a is different from an available CC for the MBSFN transmission, the HO control unit 326 determines to perform a handover to the available CC for the MBSFN transmission. In the case of performing a handover, the HO control unit 326 instructs the HO request generation unit 327 to transmit an HO request. In addition, the HO control unit 326 performs a handover procedure based on the HO control information extracted by the HO control information extraction unit 325. Subsequently, the HO control unit 326 instructs the terminal control unit 315 to change a frequency band used for wireless signal processing. Note that the inter-CC handover may be performed before or after the transmission of the MBSFN request to the base station 100a. The HO request generation unit 327 generates an HO request, which is control information indicating a request for a handover, in response to the instruction from the HO control unit 326. Subsequently, the HO request generation unit 327 outputs the generated HO request to the coding and modulation unit 323. With this, the HO request is transmitted to the base station 100a.

Figure 20:
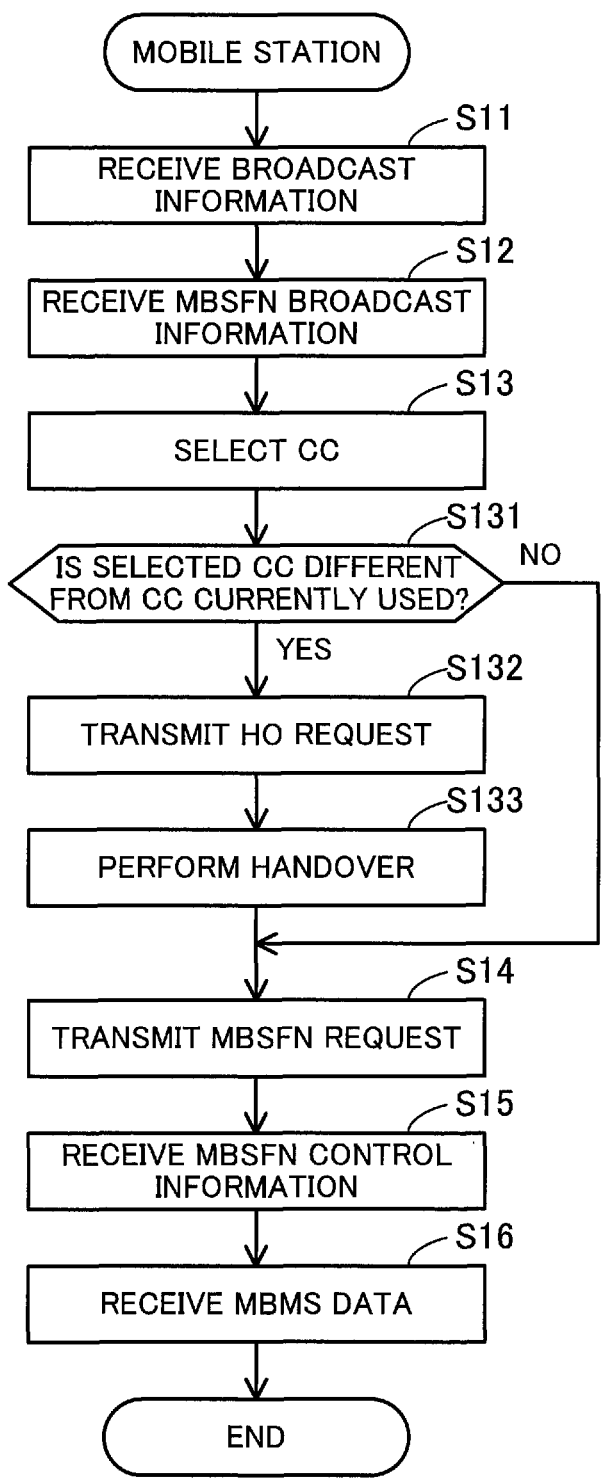
FIG. 20 is a flowchart illustrating a mobile station process according to the third embodiment.

FIG. 20 is a flowchart illustrating a mobile station process according to the third embodiment. Here, a case is considered where the mobile station 300a transmits an MBSFN request to the base station 100a. The mobile station process of the third embodiment differs from that of the second embodiment illustrated in FIG. 14 in that Steps S131 to S133 described below are performed between Steps S13 and S14.

(Step S131) The mobile station 300a determines whether the CC selected in Step S13 is different from the CC currently used to maintain a connection with the base station 100a. In the case of determining that they are different, the mobile station 300a proceeds the process to step S132. In the case of determining that they are the same, the mobile station 300a proceeds to step S14.

(Step S132) The mobile station 300a transmits, to the base station 100a using the currently used CC, an HO request indicating a change to the CC selected in Step S13.

(Step S133) On receiving HO control information from the base station 100a as a response to the HO request, the mobile station 300a performs a handover from the currently used CC to the CC selected in Step S13. Subsequent communication with the base station 100a is performed using the post-handover CC.

In the above-described manner, the mobile station 300a recognizes an available CC for the MBSFN transmission by using broadcast information broadcast by the base station 100a. Then, in the case where the currently used CC is different from the available CC, the mobile station 300a performs an inter-CC handover. With this, the mobile station 300a is able to smoothly start a service involving MBSFN transmission. According to the example of FIG. 20, the MBSFN request is transmitted after the handover is performed, however, the MBSFN request may be transmitted before the handover is performed, as described above.

Figure 21:
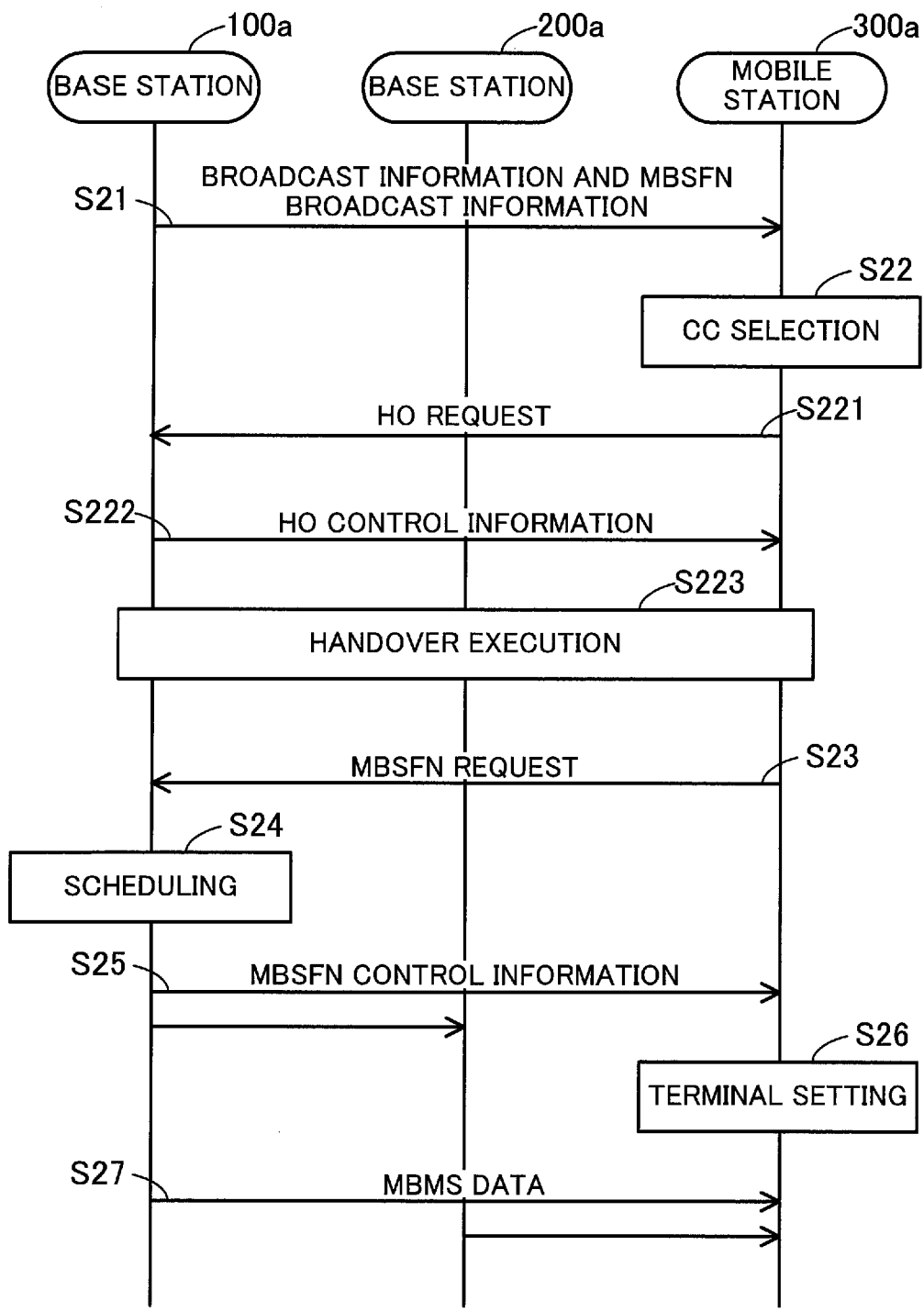
FIG. 21 is a sequence diagram illustrating an example of MBSFN control according to the third embodiment.

FIG. 21 is a sequence diagram illustrating an example of MBSFN control according to the third embodiment. The sequence example of FIG. 21 represents a case in which an MBSFN request is transmitted after a handover is performed. The sequence example of the third embodiment differs from that of the second embodiment illustrated in FIG. 15 in that Steps S221 to S223 described below are performed between Steps S22 and S23.

(Step S221) The mobile station 300a transmits, to the base station 100a using the currently used CC, an HO request indicating a change to the CC selected in Step S22.

(Step S222) The base station 100a transmits HO control information as a response to the HO request to the mobile station 300a using the currently used CC.

(Step S223) A handover is performed between the base station 100a and the mobile station 300a. That is, a CC too be used is switched to the CC selected in Step S22. Subsequently, an MBSFN request and MBSFN control information are transmitted through the post-handover CC.

Figure 22:
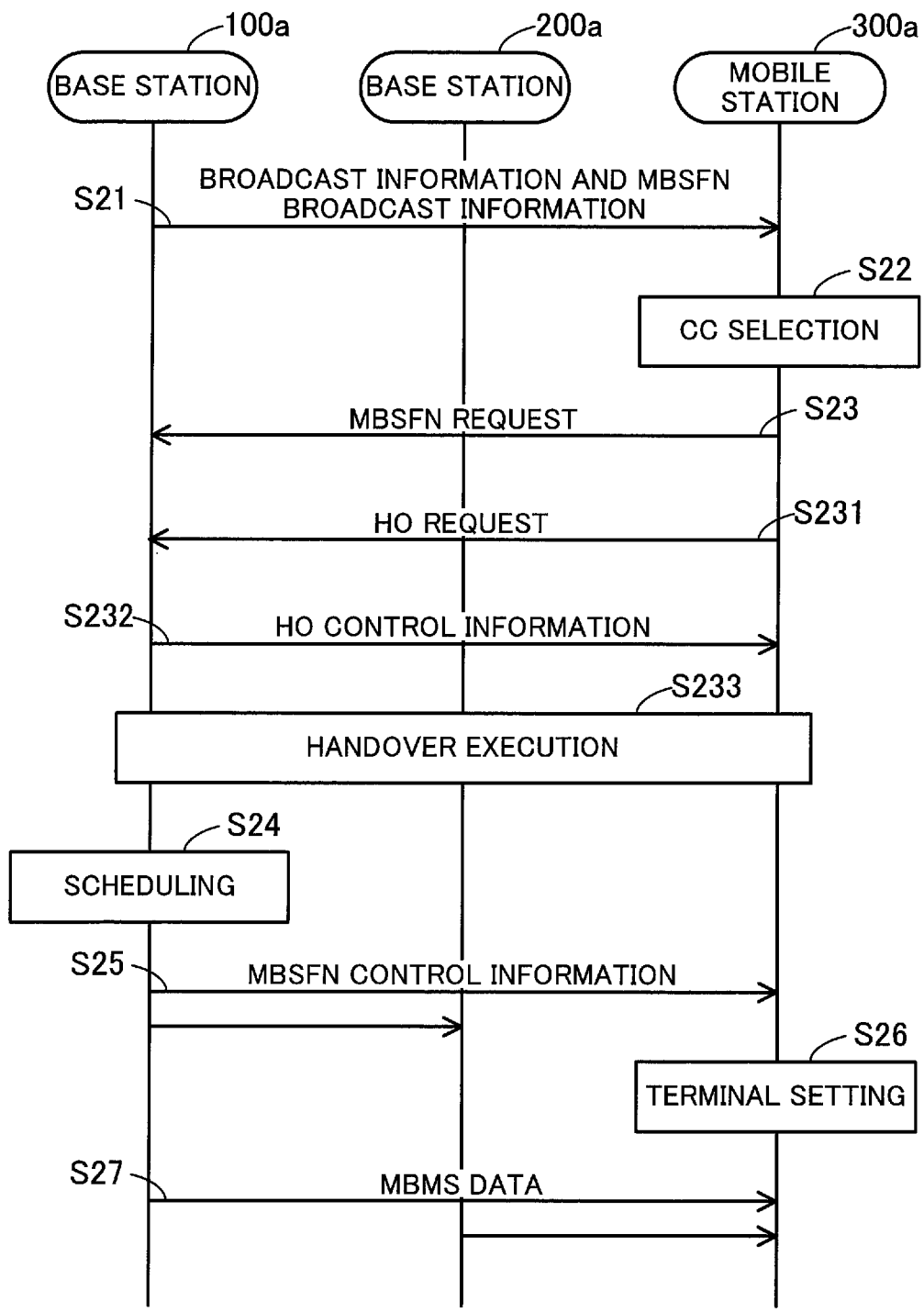
FIG. 22 is a sequence diagram illustrating another example of the MBSFN control according to the third embodiment.

FIG. 22 is a sequence diagram illustrating another example of the MBSFN control according to the third embodiment. The sequence example of FIG. 22 represents a case in which an MBSFN request is transmitted before a handover is performed. The sequence example of the third embodiment illustrated in FIG. 22 differs from that of the second embodiment illustrated in FIG. 15 in that Steps S231 to S233 are performed between Steps S23 and S24. Processing details of Steps S231 to S233 are the same as those of Steps S221 to S223 described above. Note that, according to the sequence example of FIG. 22, an MBSFN request issued from the mobile station 300a to the base station 100a is transmitted using the pre-handover CC, and MBSFN control information issued from the base station 100a to the mobile station 300a is transmitted using the post-handover CC.

According to such a mobile communications system of the third embodiment, the same effect as in the second embodiment may be achieved. Furthermore, according to the third embodiment, the mobile station 300a determines whether to perform an inter-CC handover or not by using broadcast information. Accordingly, even in the case where the MBSFN transmission cannot be performed using a currently used CC, it is possible to smoothly start a service involving MBSFN transmission.

(d) Fourth Embodiment

Next described is a fourth embodiment with reference to drawings. The following description will focus on differences from the second and third embodiments described above and description of common items will be omitted. In a mobile communications system according to the fourth embodiment, not a base station but an MME has an MCE function (i.e., a function of controlling MBSFN transmission).

Figure 23:
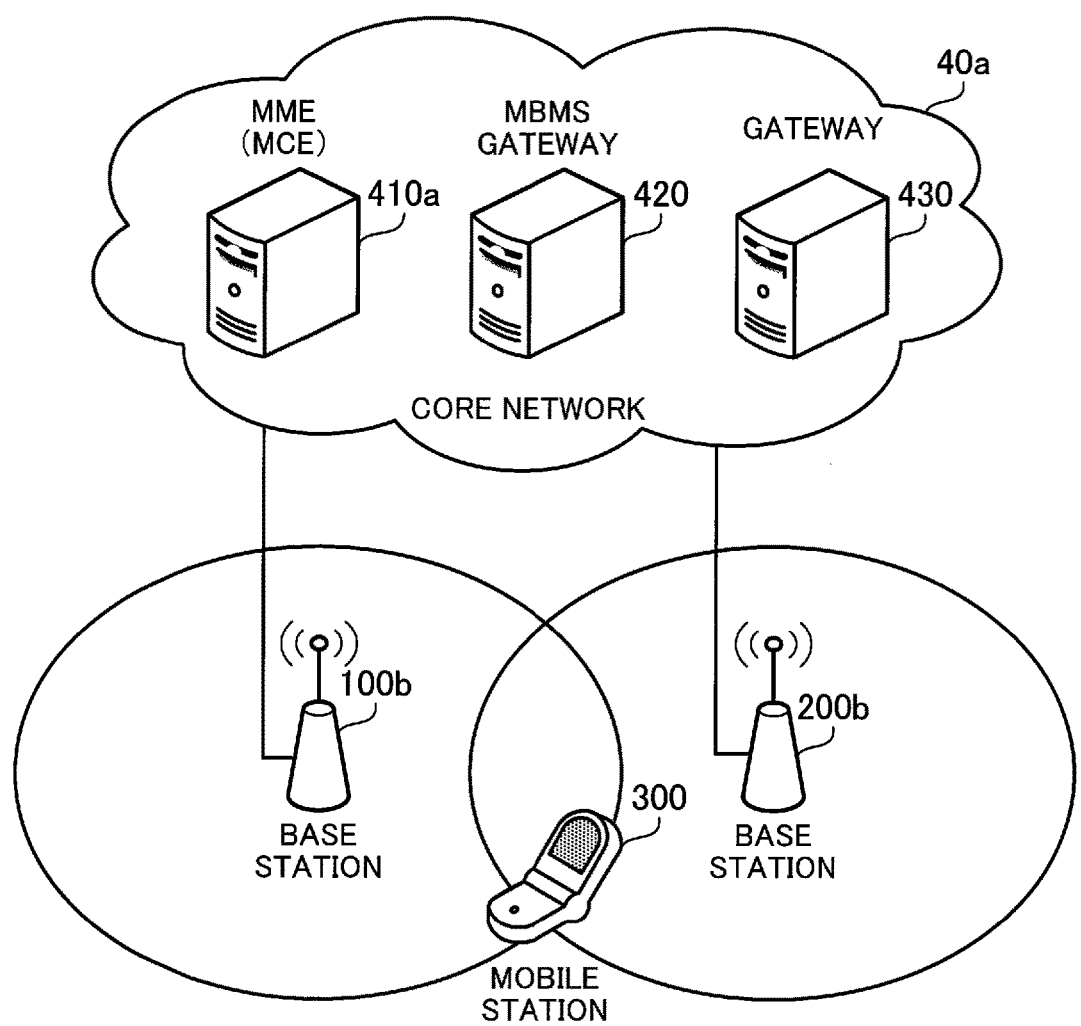
FIG. 23 illustrates a mobile communications system according to a fourth embodiment.

FIG. 23 illustrates a mobile communications system according to the fourth embodiment. The mobile communications system of the fourth embodiment includes base stations 100b, 200b, the mobile station 300, and a core network 40a. In the core network 40a, an MME 410a, the MBMS gateway 420, and the gateway 430 are provided.

The base stations 100b and 200b correspond to the base stations 100 and 200, respectively, of the second embodiment. Note however that the base stations 100b and 200b do not have the MCE function. That is, the base stations 100b and 200b forward the MBSFN request received from the mobile station 300 to the MME 410a. In addition, the base stations 100b and 200b receive control information related to the MBSFN transmission from the MME 410a. Except for not having the MCE function, each of the base stations 100b and 200b may be achieved using the same configuration as that of the base station 100 of FIG. 12. The MME 410a corresponds to the MME 410 of the second embodiment. Note however that the MME 410a is further equipped with the MCE function. That is, the MME 410a receives an MBSFN request from the base station 100b and 200b and performs scheduling of the MBSFN transmission. Subsequently, the MME 410a transmits the control information related to the MBSFN transmission to the base stations 100b and 200b.

Figure 24:
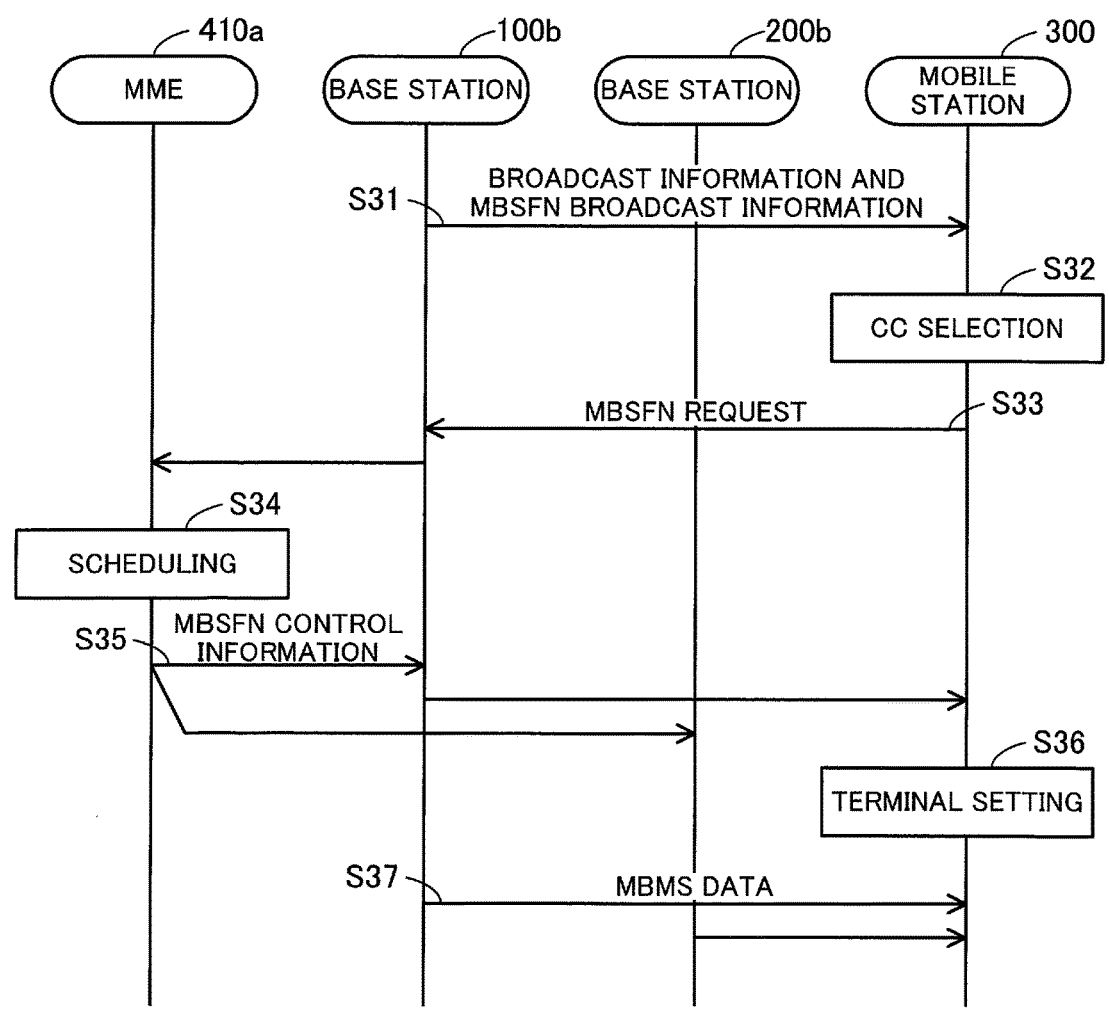
FIG. 24 is a sequence diagram illustrating a first example of MBSFN control according to the fourth embodiment.

FIG. 24 is a sequence diagram illustrating a first example of MBSFN control according to the fourth embodiment. The sequence example of FIG. 24 represents a case in which the MME 410a makes the base stations 100b and 200b perform the MBSFN transmission.

(Step S31) The base station 100b transmits broadcast information using the PBCH. In addition, the base station 100b transmits broadcast information related to the MBSFN transmission using the E-PBCH (or a different predetermined channel). The mobile station 300 detects the PBCH and the E-PBCH (or the different predetermined channel) and extracts the broadcast information transmitted by the base station 100b.

(Step S32) Based on the broadcast information related to the MBSFN transmission, the mobile station 300 identifies, among CCs #1 to #5, one or more available CCs for the MBSFN transmission. Then, the mobile station 300 selects a CC to be used for receiving MBMS data.

(Step S33) The mobile station 300 transmits an MBSFN request to the base station 100b using the PUSCH of the selected CC (or a CC that the mobile station 300 currently uses). The base station 100b extracts the MBSFN request transmitted by the mobile station 300 and transfers the extracted MBSFN request to the MME 410a. The MME 410a receives the MBSFN request transferred by the base station 100b.

(Step S34) In response to the MBSFN request transmitted by the mobile station 300, the MME 410a performs control as an MCE. That is, the MME 410a performs scheduling and determines a range of base stations for performing the MBSFN transmission, an MCS to be applied to MBMS data, a transmission timing and so on. Assume here that the base stations 100b and 200b perform the MBSFN transmission.

(Step S35) The MME 410a transmits control information related to the MBSFN transmission to the base stations 100b and 200b. The base station 100b to which the mobile station 300 is currently connected transmits the control information related to the MBSFN transmission using the PMCH of the CC used for the MBSFN transmission. The mobile station 300 detects the PMCH and extracts the control information transmitted by the base station 100b.

(Step S36) Based on the control information related to the MBSFN transmission received from the base station 100b, the mobile station 300 makes appropriate setting therein to receive the MBMS data from the base stations 100b and 200b.

(Step S37) Based on the control information received from the MME 410a, the base stations 100b and 200b transmit the MBMS data received from the gateway 430 to the mobile station 300 using the PMCH. The mobile station 300 combines signals received from the base stations 100b and 200b and extracts the MBMS data.

In the above-described manner, when the mobile station 300 transmits an MBSFN request, the MBSFN request is transferred to the MME 410a. In response to the MBSFN request, the MME 410a performs scheduling of the MBSFN transmission and causes the base stations 100b and 200b to perform the MBSFN transmission. Note that the sequence example of FIG. 24 represents a case in which an inter-CC handover is not performed, as in the second embodiment. On the other hand, as in the third embodiment, an inter-CC handover may be performed when a currently used CC is different from an available CC for the MBSFN transmission. The following description is directed to a sequence example in which the mobile station 300a described in the third embodiment transmits an MBSFN request to the base station 100b. In this case, each of the base stations 100b and 200b may be achieved using the same configuration as that of the base station 100a of FIG. 18.

Figure 25:
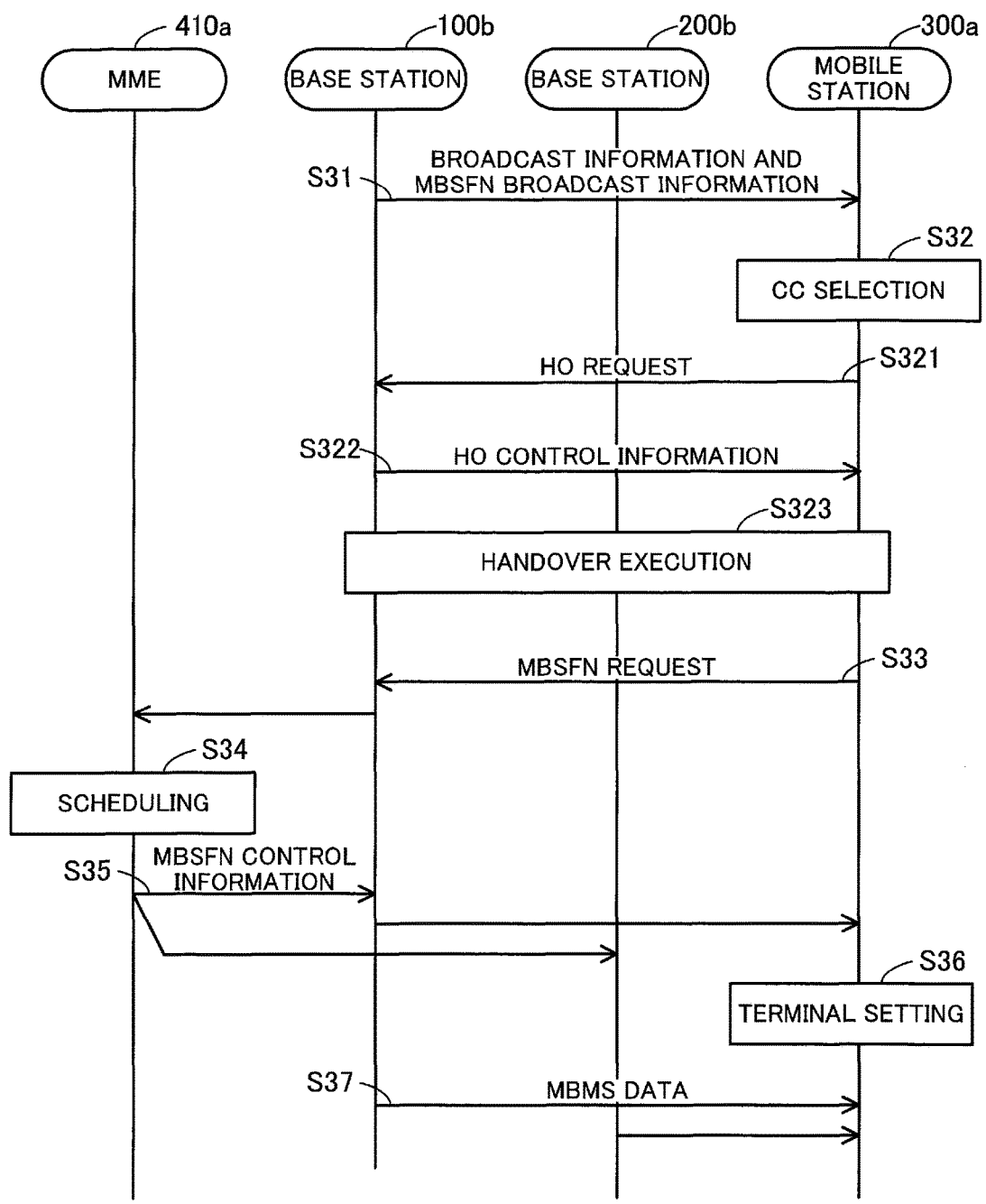
FIG. 25 is a sequence diagram illustrating a second example of the MBSFN control according to the fourth embodiment.

FIG. 25 is a sequence diagram illustrating a second example of the MBSFN control according to the fourth embodiment. The sequence example of FIG. 25 represents a case in which an MBSFN request is transmitted after a handover is performed. The sequence example of FIG. 25 differs from that of FIG. 24 in that Steps S321 to S323 described below are performed between Steps S32 and S33.

(Step S321) The mobile station 300a transmits, to the base station 100b using the currently used CC, an HO request indicating a change to the CC selected in Step S32.

(Step S322) The base station 100b transmits HO control information as a response to the HO request to the mobile station 300a using the currently used CC.

(Step S323) A handover is performed between the base station 100b and the mobile station 300a. That is, a CC to be used is switched to the CC selected in Step S32. Subsequently, between the base station 100b and the mobile station 300a, an MBSFN request and MBSFN control information are transmitted using the post-handover CC.

Figure 26:
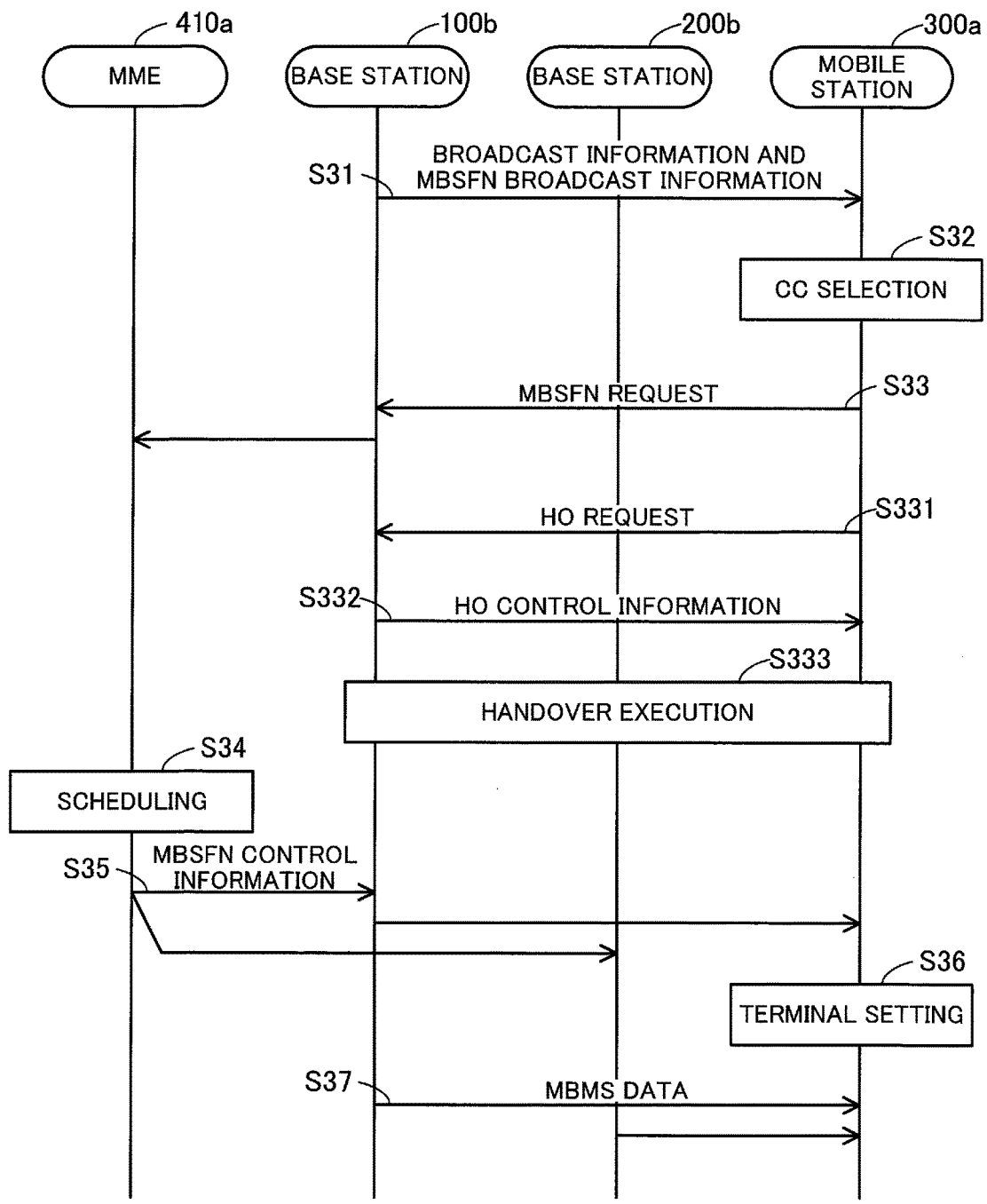
FIG. 26 is a sequence diagram illustrating a third example of the MBSFN control according to the fourth embodiment.

FIG. 26 is a sequence diagram illustrating a third example of the MBSFN control according to the fourth embodiment. The sequence example of FIG. 26 represents a case in which an MBSFN request is transmitted before a handover is performed. The sequence example of FIG. 26 differs from that of FIG. 24 in that Steps S331 to S333 are performed between Steps S33 and S34. Processing details of Steps S331 to S333 are the same as those of Steps S321 to S323 described above. Note that, according to the sequence example of FIG. 26, an MBSFN request issued from the mobile station 300a to the base station 100b is transmitted using the pre-handover CC. The base station 100b may transfer the received MBSFN request to the MME 410a before a handover is performed. MBSFN control information issued from the base station 100b to the mobile station 300a is transmitted using the post-handover CC.

According to such a mobile communications system of the fourth embodiment, the same effect as in the second and third embodiments may be achieved. Furthermore, the fourth embodiment eliminates the necessity of implementing the MCE function on each base station, and control of the MBSFN transmission is performed collectively on the core network 40a side. Note that, in the above description of the fourth embodiment, the MCE function is implemented on the MME 410a, however, the MCE function may be implemented on another apparatus in the core network 40a. Alternatively, a stand-alone apparatus having the MCE function may be provided inside or outside the core network 40a. In that case, the base stations 100b and 200b communicate with the stand-alone apparatus when performing MBSFN transmission.

Figure 27:
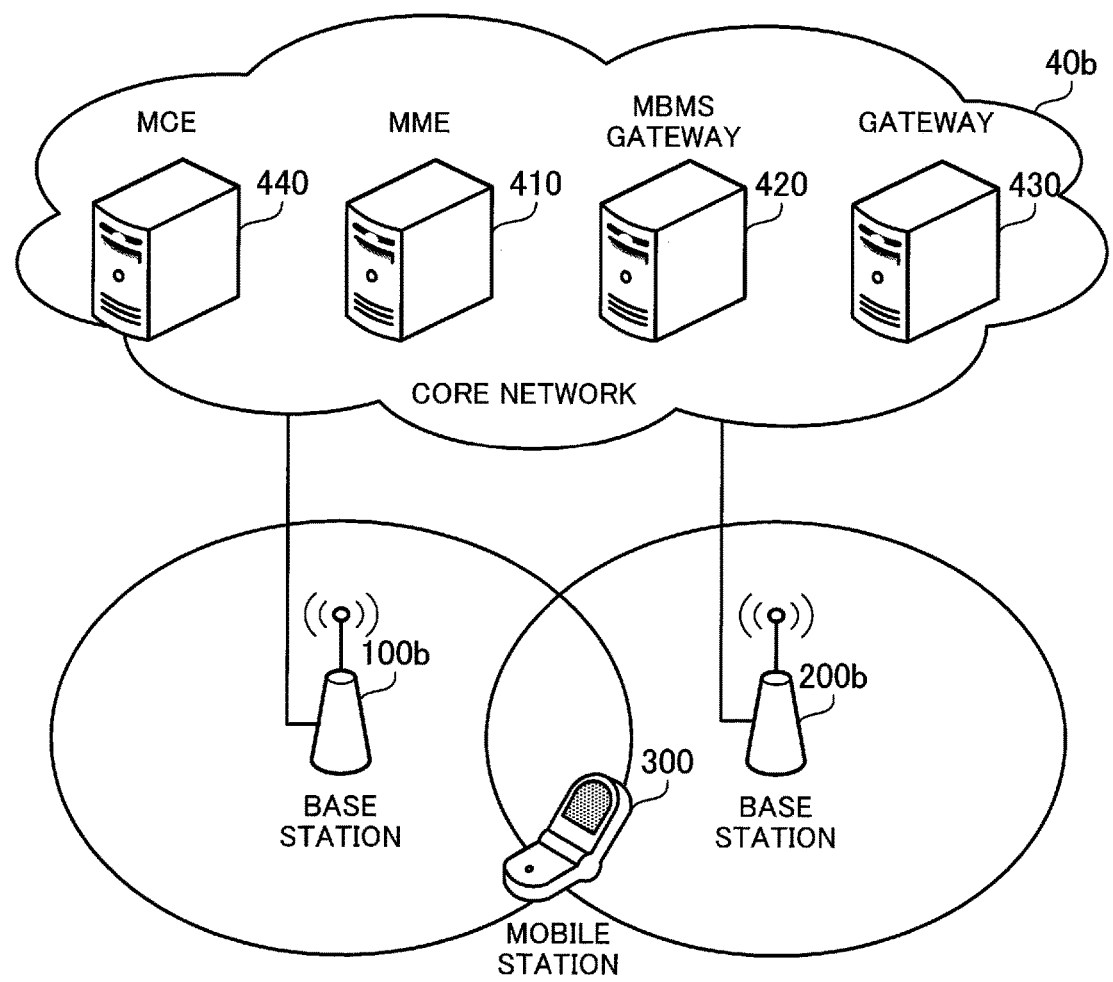
FIG. 27 illustrates a modification example of the mobile communications system of the fourth embodiment.

FIG. 27 illustrates a modification of the mobile communications system of the fourth embodiment. The mobile communications system includes the base stations 100b and 200b, the mobile station 300, and a core network 40b. In the core network 40b, the MME 410, the MBMS gateway 420, the gateway 430, and an MCE 440 are provided. The MCE 440 is a stand-alone apparatus for controlling MBSFN transmission. The MCE 440 receives an MBSFN request from the base stations 100b and 200b and performs scheduling of the MBSFN transmission. Subsequently, the MCE 440 transmits control information related to the MBSFN transmission to the base stations 100b and 200b. In such a mobile communications system, the processes performed by the MME 410a in the sequence examples illustrated in FIGS. 24 to 26 are performed by the MCE 440 instead. In this way, a stand-alone apparatus having the MCE function is provided in the mobile communications system.

Although the MBSFN transmission is described in the second to fourth embodiments above, the mobile communications system according to the second to fourth embodiments may further perform MBMS transmission. The MBMS transmission is a transmission scheme for broadcasting/multicasting MBMS data, as in the case of the MBSFN transmission. Differences between the MBSFN transmission and the MBMS transmission are as described below. In the MBSFN transmission, a plurality of base stations transmit MBMS data at the same timing using the same frequency and the same modulation scheme. A subframe used for the MBSFN transmission is an MBSFN subframe, which is different from a normal subframe, and normal data and MBMS data are not held together in a single MBSFN subframe. In addition, the same scheduling results are applied to a plurality of base stations that perform the MBSFN transmission. A mobile station receives MBMS data from a plurality of base stations in parallel. On the other hand, in the MBMS transmission, each base station individually sets a timing of transmitting MBMS data, and a frequency and a modulation scheme to be used. Scheduling of the MBMS transmission is performed by individual base stations. For the MBMS transmission, normal subframes may be used, and normal data and MBMS data may be held together in a single subframe. A mobile station receives MBMS data from a single base station. Thus, in the case of the MBMS transmission, a base station is able to perform scheduling with normal data and MBMS data being mixed together. That is, a downlink shared channel (DL-SCH) which is a transport channel for transmitting normal data and a multicast channel (MCH) which is a transport channel for transmitting MBMS data can be mapped together in a downlink shared channel (PDSCH). Using the MBMS transmission enables services of certain types to be provided readily and locally (for example, distributing information of a certain type at a specific location). Note that, since both normal data and MBMS data can be held together in a single subframe in the MBMS transmission, it is possible to perform scheduling in such a manner that the efficiency in wireless resource use is not reduced even when the MBMS transmission is performed with a plurality of CCs in parallel.

According to the above-described mobile communications system, base station, mobile station, and wireless communication method, it is possible to improve the efficiency in wireless resource use in the case where a plurality of base stations transmit same data at the same timing.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communications system comprising:
   a mobile station; and
   a base station configured to communicate with the mobile station,
   the base station including:
      a generator configured to generate frequency band information including an identification number assigned to a first frequency band among a plurality of identification numbers assigned to a plurality of frequency bands respectively, wherein the first frequency band is to be used to broadcast same broadcast/multicast data at a same timing with another base station, and wherein a second frequency band among the plurality of frequency bands is to be used to transmit dedicated data, and
      a transmitter configured to broadcast the frequency band information; and
   the mobile station including:
      a receiver configured to receive the frequency band information from the base station, and
      a controller configured to control, based on the identification number, assigned to the first frequency band, included in the frequency band information, reception of the same broadcast/multicast data with the first frequency band.

2. The mobile communications system according to claim 1, wherein when the first frequency band indicated by the frequency band information is different from the second frequency band used by the mobile station to connect to the base station, the controller makes a change or addition of a frequency band to be used.

3. The mobile communications system according to claim 1, wherein the transmitter transmits, using a first physical broadcast channel, other frequency band information to be used by the mobile station to set up a connection to the base station, and broadcasts the frequency band information using a second physical broadcast channel which is different from the first physical broadcast channel.

4. The mobile communications system according to claim 3, wherein
   the first physical broadcast channel is a channel received by both a first-type mobile station and a second-type mobile station, and the second physical broadcast channel is a channel received by the second-type mobile station, wherein the first-type mobile station performing communication based on a communication specification or a communication system, and the second-type mobile station performing communication based on another communication specification or another communication system.

5. The mobile communications system according to claim 1, wherein in order to broadcast the frequency band information, the transmitter uses a control channel for broadcasting control information to be used by the mobile station to receive the same broadcast/multicast data at the same timing with said another base station.

6. The mobile communications system according to claim 1, wherein:
among the plurality of frequency bands, at least a lowest frequency band is used to broadcast the same broadcast/multicast data at the same timing with said another base station.

7. A base station for performing wireless communication with a mobile station capable of receiving data transmitted by a plurality of base stations, the base station comprising:
a generator configured to generate frequency band information including an identification number assigned to a first frequency band among a plurality of identification numbers assigned to a plurality of frequency bands respectively, wherein the first frequency band is to be used to broadcast same broadcast/multicast data at a same timing with another base station, and wherein a second frequency band among the plurality of frequency bands is to be used to transmit dedicated data; and
a transmitter configured to broadcast the frequency band information.

8. A mobile station for performing wireless communication with a first base station and a second base station, the mobile station comprising:
a receiver configured to receive frequency band information, which is broadcasted by the first base station, the frequency band information including an identification number assigned to a first frequency band among a plurality of identification numbers assigned to the plurality of frequency bands respectively, wherein the first frequency band is to be used to broadcast same broadcast/multicast data at a same timing with the second base station, and wherein a second frequency band among the plurality of frequency bands is to be used to transmit dedicated data; and
a controller configured to control, based on the identification number, assigned to the first frequency band, included in the frequency band information, reception of the same broadcast/multicast data with the first frequency band.

9. A wireless communication method used in a mobile communications system which includes a first base station, a second base station, and a mobile station capable of performing wireless communication, the wireless communication method comprising:
generating, by the first base station, frequency band information including an identification number assigned to a first frequency band among a plurality of identification numbers assigned to a plurality of frequency bands respectively, wherein the first frequency band is to be used to broadcast same broadcast/multicast data at a same timing with the second base station, and wherein a second frequency band among the plurality of frequency bands is to be used to transmit dedicated data;
broadcasting, by the first base station, the frequency band information;
receiving, by the mobile station, the frequency band information from the first base station; and
receiving, by the mobile station, the same broadcast/multicast data with the first frequency band indicated by the frequency band information.

* * * * *